(12) United States Patent
Moyer et al.

(10) Patent No.: US 10,394,761 B1
(45) Date of Patent: Aug. 27, 2019

(54) SYSTEMS AND METHODS FOR ANALYZING AND STORING NETWORK RELATIONSHIPS

(71) Applicant: Skroot LLC, Atlanta, GA (US)

(72) Inventors: Francis Moyer, Atlanta, GA (US); Daniel Simmons, Atlanta, GA (US)

(73) Assignee: SKROOT LLC, Atlanta, GA (US)

( * ) Notice: Subject to any disclaimer, the term of this patent is extended or adjusted under 35 U.S.C. 154(b) by 221 days.

(21) Appl. No.: 15/169,395

(22) Filed: May 31, 2016

Related U.S. Application Data

(60) Provisional application No. 62/168,122, filed on May 29, 2015.

(51) Int. Cl.
*G06F 16/14* (2019.01)
*G06F 16/2457* (2019.01)
*H04L 29/08* (2006.01)
*G06F 21/62* (2013.01)

(52) U.S. Cl.
CPC .......... *G06F 16/152* (2019.01); *G06F 16/14* (2019.01); *G06F 16/24578* (2019.01); *G06F 21/6245* (2013.01); *H04L 67/1072* (2013.01)

(58) Field of Classification Search
CPC ......... G06F 17/30011; G06F 17/30017; G06F 17/30023; G06F 17/30038; G06F 17/301; G06F 17/30106; G06F 17/30109; G06F 17/30386; G06F 17/3053; G06F 17/30864; G06F 17/30997; G06F 21/602; G06F 21/6218; G06F 21/6227; G06F 21/6245; G06F 21/6254; G06F 16/14; G06F 16/148; G06F 16/152; G06F 16/22; G06F 16/2228; G06F 16/2255; G06F 16/245; G06F 16/2455; G06F 16/2457; G06F 16/24578
See application file for complete search history.

(56) References Cited

U.S. PATENT DOCUMENTS

| 5,692,177 | A | | 11/1997 | Miller | |
|---|---|---|---|---|---|
| 6,006,225 | A | * | 12/1999 | Bowman | G06F 17/30864 |
| 8,027,983 | B1 | * | 9/2011 | Nandy | G06F 16/283 |
| | | | | | 707/747 |
| 2002/0073138 | A1 | * | 6/2002 | Gilbert | G06F 21/6227 |
| | | | | | 709/201 |

(Continued)

OTHER PUBLICATIONS

Yun, et al., On Protecting Integrity and Confidentiality of Cryptographic File System for Outsourced Storage, CCSW'09, Nov. 13, 2009, (9 pages).

*Primary Examiner* — Vivek Srivastava
*Assistant Examiner* — William C McBeth
(74) *Attorney, Agent, or Firm* — Cantor Colburn LLP

(57) ABSTRACT

Systems and methods for augmenting, inferring, extrapolating, deducing, reasoning, and storing logical networks of information represented in digest form are disclosed. The disclosed systems and methods enable the combined inclusion of both sensitive information and non-sensitive information into a compressed, universal, indiscernible format. Relationships can be derived or inferred between unintelligible digests of information by associating them with a common underlying entity. A universal digest format described herein may become comprehensible by further utilizing additional a priori or a posteriori knowledge of the information such that recognized digests can be utilized fully while unknown and potentially sensitive digests remain undecipherable.

7 Claims, 26 Drawing Sheets

(56) References Cited

U.S. PATENT DOCUMENTS

| | | | |
|---|---|---|---|
| 2009/0240680 A1* | 9/2009 | Tankovich | G06F 17/3053 |
| 2012/0226916 A1* | 9/2012 | Hahn | G06F 21/6245 |
| | | | 713/193 |
| 2014/0052999 A1* | 2/2014 | Aissi | G06F 21/6245 |
| | | | 713/189 |
| 2014/0164758 A1* | 6/2014 | Ramamurthy | G06F 21/6227 |
| | | | 713/150 |
| 2014/0244300 A1* | 8/2014 | Bess | G06F 16/24578 |
| | | | 705/3 |
| 2015/0039901 A1* | 2/2015 | Freeman | G06F 21/6227 |
| | | | 713/189 |
| 2015/0154194 A1* | 6/2015 | Lightner | G06F 16/24578 |
| | | | 707/730 |
| 2015/0227624 A1* | 8/2015 | Busch | G06F 17/3053 |
| | | | 707/728 |
| 2015/0310115 A1* | 10/2015 | Ryger | G06F 17/3053 |
| | | | 707/708 |
| 2015/0356086 A1* | 12/2015 | Kamotsky | G06F 17/3053 |
| | | | 707/731 |
| 2016/0004991 A1* | 1/2016 | Bloom | G06Q 10/06311 |
| | | | 705/7.15 |
| 2016/0027045 A1 | 1/2016 | Kurian et al. | |
| 2016/0127325 A1 | 5/2016 | Odenheimer et al. | |
| 2016/0132924 A1* | 5/2016 | Thirugnanasundaram | |
| | | | G06Q 30/0252 |
| | | | 705/14.5 |
| 2017/0161375 A1* | 6/2017 | Stoica | G06F 16/353 |

* cited by examiner

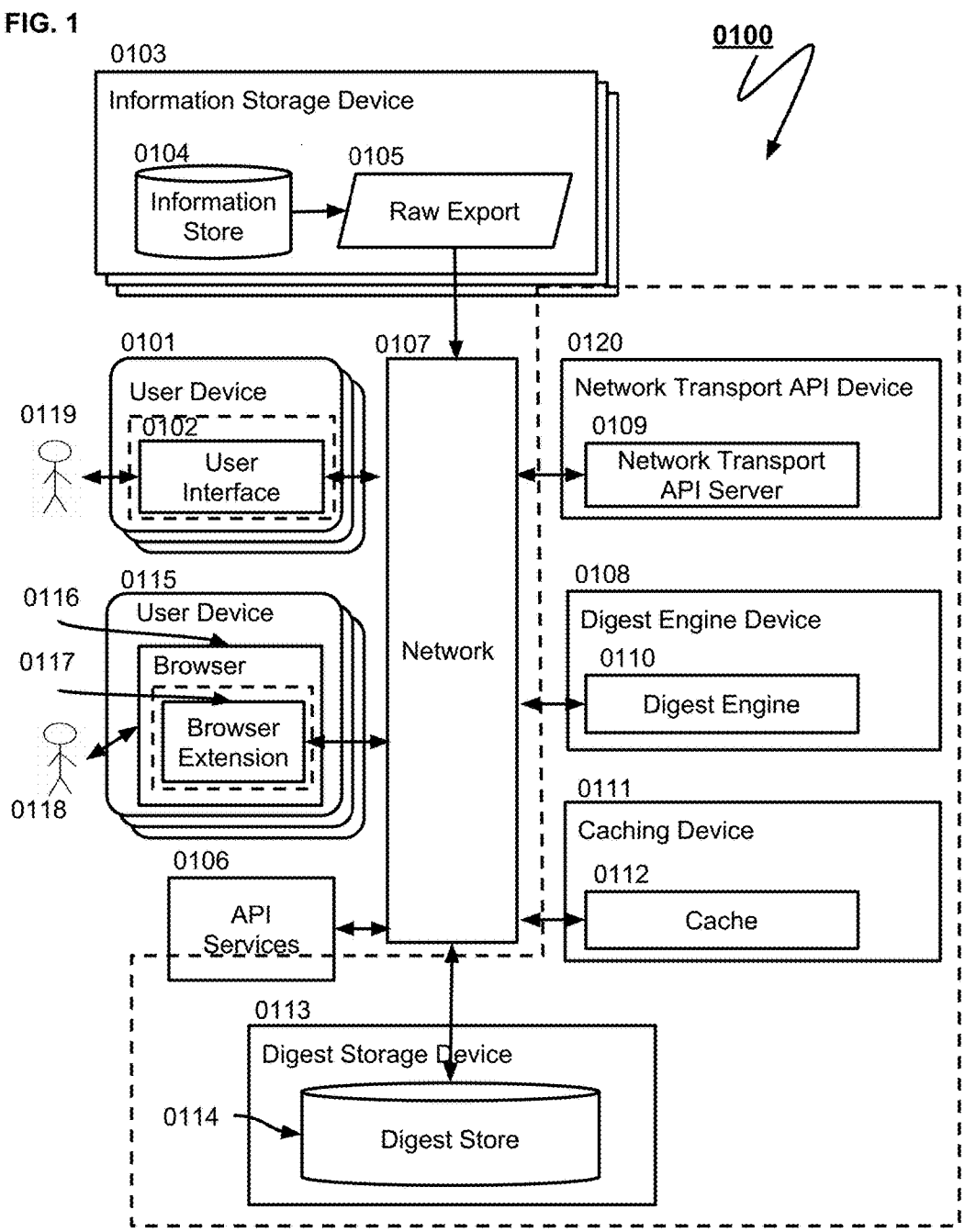

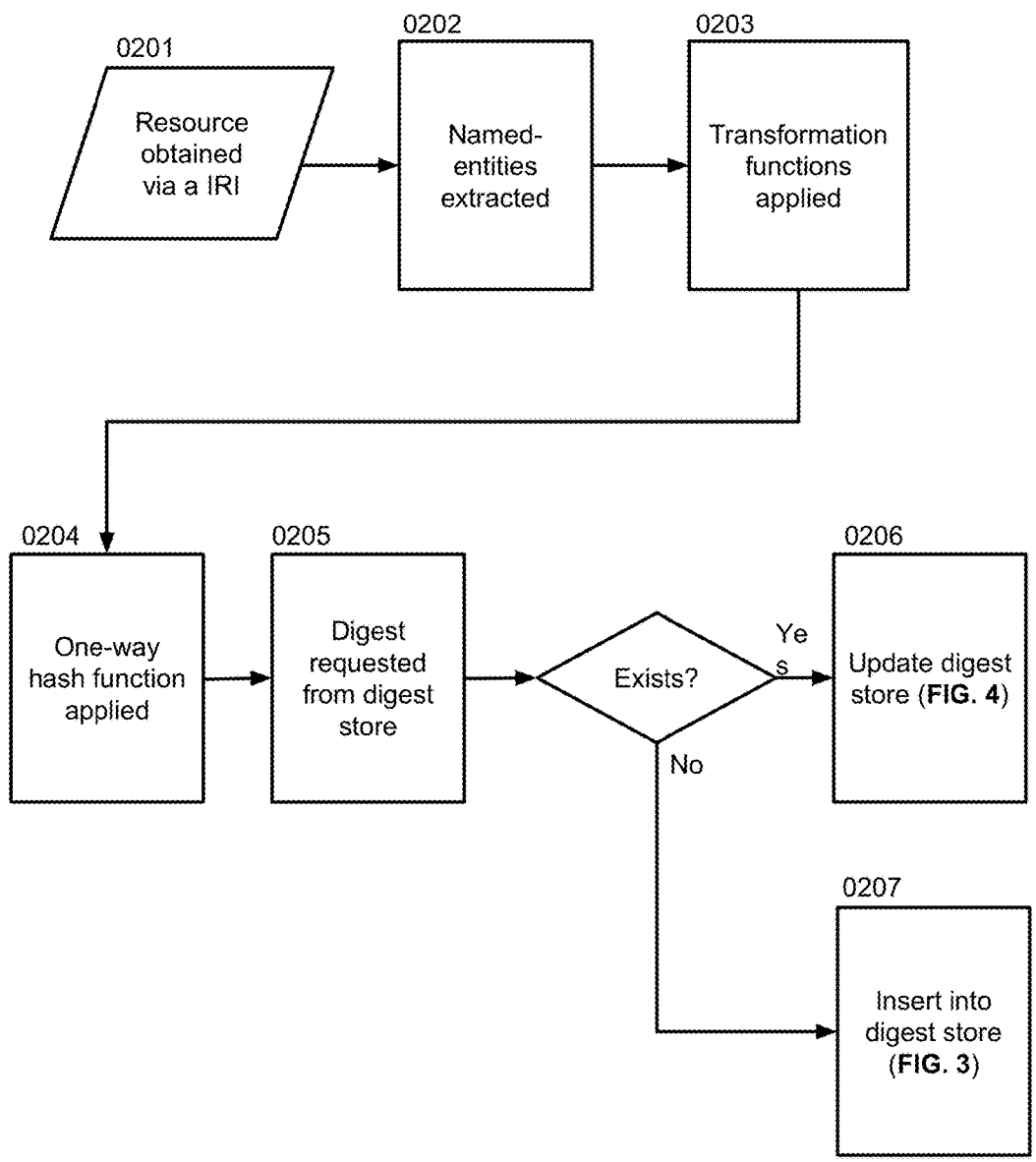

0301: WriteDigest(d, r, uri)   ( d and r are sets of component digests, uri)
0302:       label d's composite digest as written;
0303:       read v from digest store using value d's composite digest
0304:       write association of uri to digest store for v
0305:       for all x in r do
0306:            append x to d to create d'
0307:            remove x from r to create r'
0308:            if composite digest of d' is not labeled as written
0309:                 recursively call WriteDigest(d', r', uri)
0310: return

```
0401: UpdateDigest(d, iri)  ( d is set of digests, iri)
0402:       read all digests for iri from digest store into S
0403:       create set D from digests in S and not in d
0404:       create set A from digests in d and not in S
0405:       for each digest x in D:
0406:          for each digest y in S:
0407:             if digest x is a subset of digest y:
0408:                remove reference of iri for y in digest store
0409:                if no iri references remain for y, delete y from digest store
0410:       for each digest z in A:
0411:          create set r from d minus z
0412:          call method 0300 from FIG. 3 with WriteDigest(z, r, iri)
0413: return
```

| Digest record | |
|---|---|
| Key | array of digests |
| InputIds | array of identifiers |
| IRIs | array of IRIs |
| CommonDigests | array of digests |
| IRIsBelow | array of digests |
| Metadata | key-value map |

0602

| Information store reference | |
|---|---|
| InputId | identifier |
| InformationStoreDigests | array of digests |

0603

| IRI reference | |
|---|---|
| IRI | identifier |
| IRIDigests | array of digests |

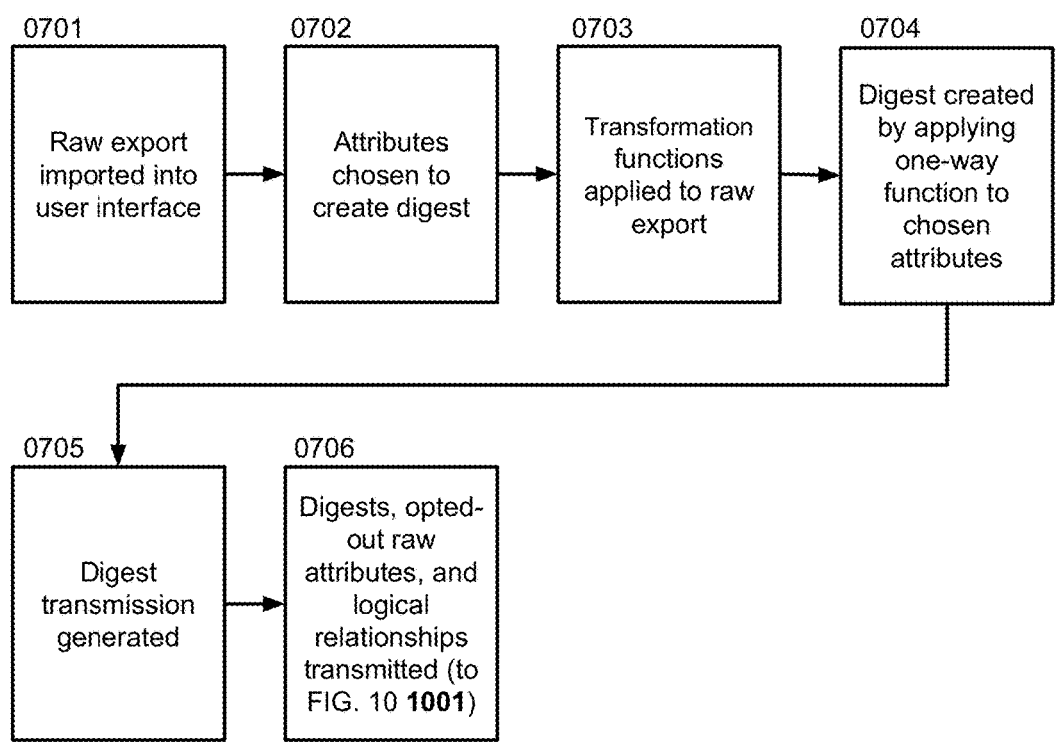
FIG. 7     0700

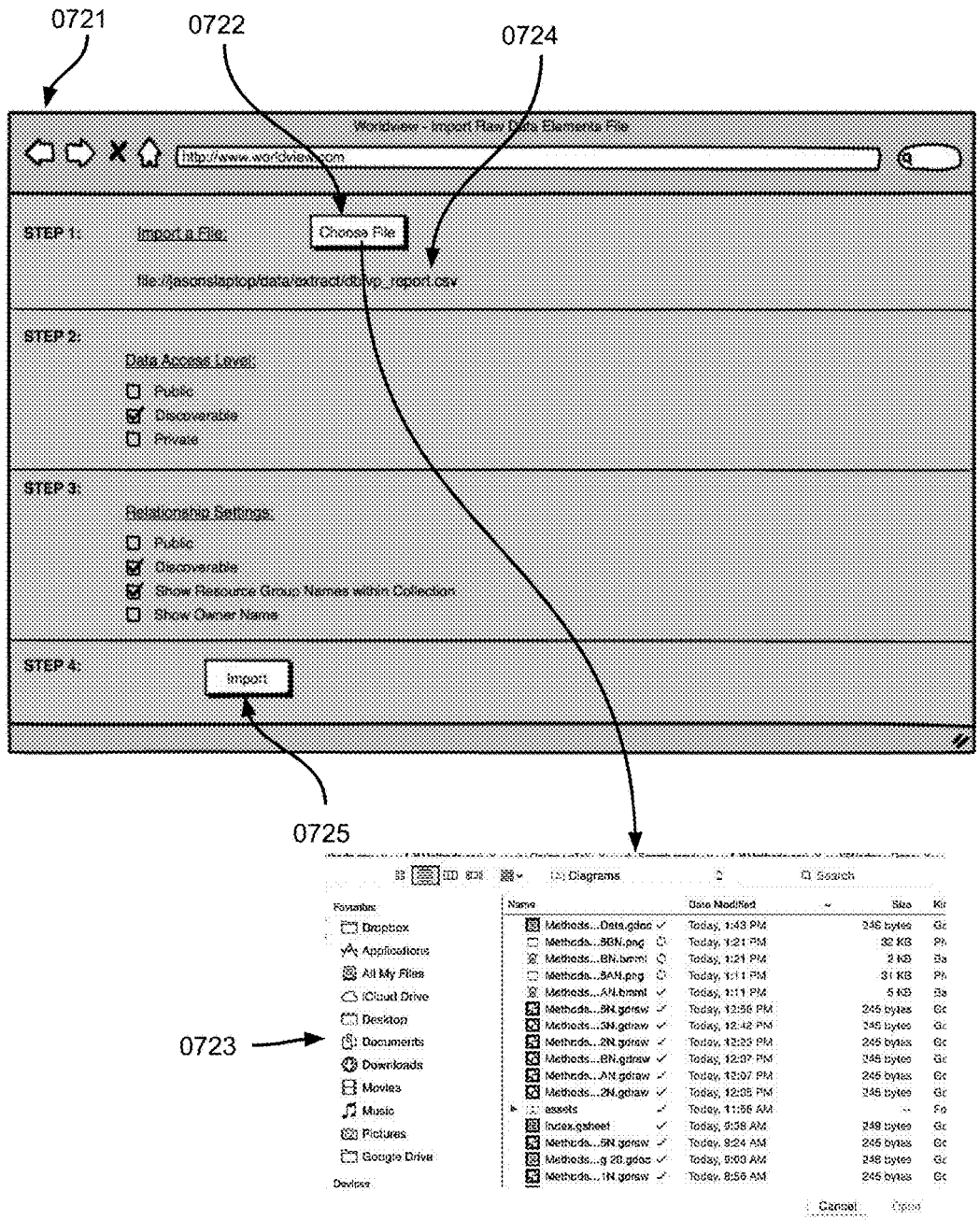

FIG. 8A

| Institution | City | State | Country | Gender | Age Range | Contribution |
|---|---|---|---|---|---|---|
| Georgia Institute of Technology | Atlanta | GA | United States | Female | 20-29 | 736 |
| Massachusetts Institute of Technology | Atlanta | GA | United States | Female | 20-29 | 483 |
| University of Virginia | Atlanta | GA | United States | Female | 20-29 | 272 |
| Georgia Institute of Technology | Boston | MA | United States | Female | 20-29 | 608 |
| Massachusetts Institute of Technology | Boston | MA | United States | Female | 20-29 | 355 |
| University of Virginia | Boston | MA | United States | Female | 20-29 | 297 |
| Georgia Institute of Technology | Chicago | IL | United States | Female | 20-29 | 593 |
| Massachusetts Institute of Technology | Chicago | IL | United States | Female | 20-29 | 304 |
| University of Virginia | Chicago | IL | United States | Female | 20-29 | 717 |
| Georgia Institute of Technology | Houston | TX | United States | Female | 20-29 | 135 |
| Massachusetts Institute of Technology | Houston | TX | United States | Female | 20-29 | 612 |
| University of Virginia | Houston | TX | United States | Female | 20-29 | 148 |
| Georgia Institute of Technology | Richmond | VA | United States | Female | 20-29 | 398 |
| Massachusetts Institute of Technology | Richmond | VA | United States | Female | 20-29 | 664 |
| University of Virginia | Richmond | VA | United States | Female | 20-29 | 713 |
| Georgia Institute of Technology | Atlanta | GA | United States | Male | 20-29 | 438 |
| Massachusetts Institute of Technology | Atlanta | GA | United States | Male | 20-29 | 592 |
| University of Virginia | Atlanta | GA | United States | Male | 20-29 | 773 |
| Georgia Institute of Technology | Boston | MA | United States | Male | 20-29 | 918 |
| Massachusetts Institute of Technology | Boston | MA | United States | Male | 20-29 | 969 |
| University of Virginia | Boston | MA | United States | Male | 20-29 | 378 |
| Georgia Institute of Technology | Chicago | IL | United States | Male | 20-29 | 533 |
| Massachusetts Institute of Technology | Chicago | IL | United States | Male | 20-29 | 148 |
| University of Virginia | Chicago | IL | United States | Male | 20-29 | 490 |
| Georgia Institute of Technology | Houston | TX | United States | Male | 20-29 | 194 |
| Massachusetts Institute of Technology | Houston | TX | United States | Male | 20-29 | 539 |

FIG. 8B

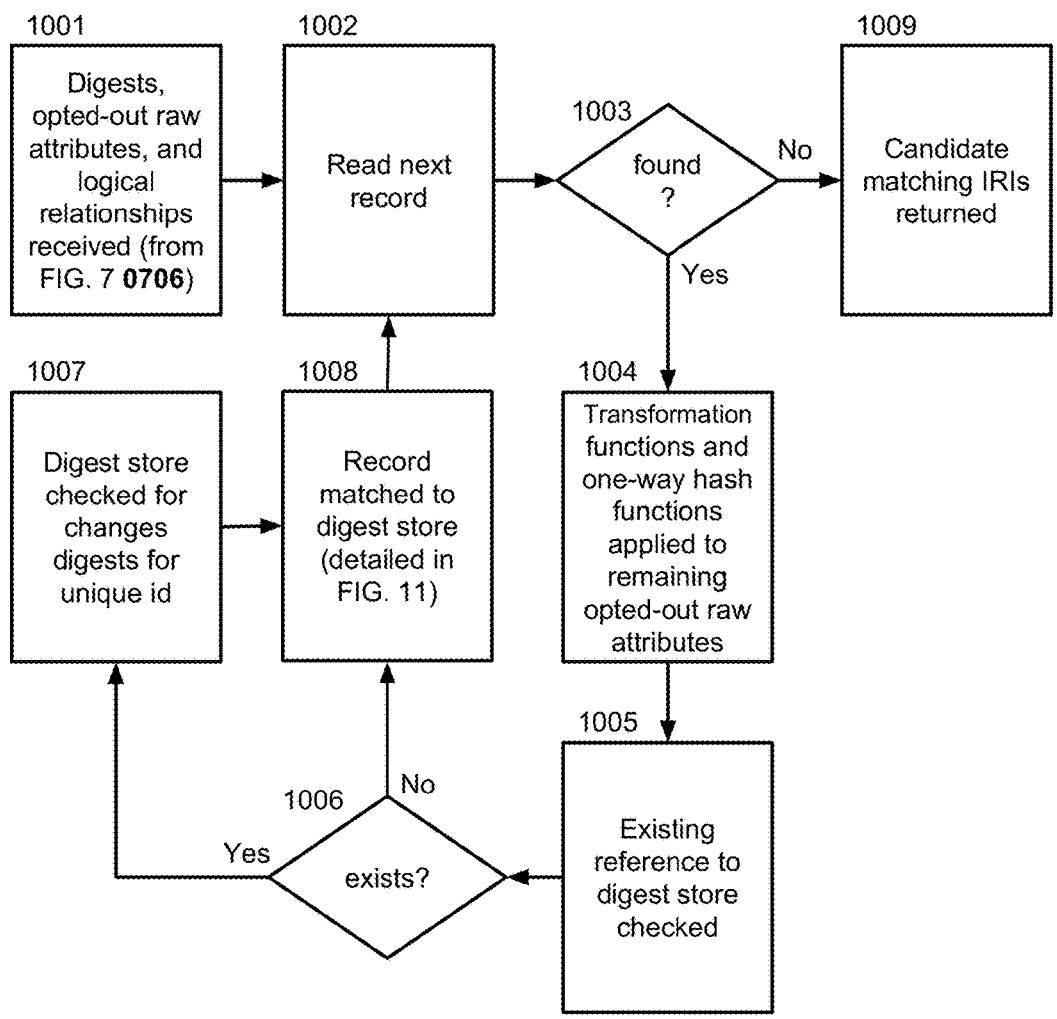

1101: Match01(d, w)   (d is a set of component digests, w is a set of raw attributes)
1102:       apply transformations to each element of w
1103:       apply one-way hash function to each output element of 1102
1104:       query synonyms for each element of d
1105:       union output of 1103 and output of 1104 to create d'
1106:       create ordered set S and result set T
1107:       call Match02(null, d')
1108: return result set T

1120

1121: Match02(c, r)   (c and r are sets of component digests)
1122:       if threshold reached, return
1123        if c == null set, set r' = r and go to 1132
1124:       label c's composite form as visited
1125:       read v from digest store using c's composite form as key
1126:       if no record found, return
1127:       calculate match score
1128:       add c, r and match score to S
1129:       add IRIs from v, c and match score to T
1130:       if threshold reached, return
1131:       retrieve highest match score from S into c' and r'
1132:       for all x in r' do
1133:              append x to c' and to create m
1134:              remove x from r' to create n
1135:              if m's composite form is not labeled as visited
1136:                     recursively call Match02(m, n)
1137: return

FIG. 11A

$$w_L \frac{D_L}{S_L} + w_k D_k + w_S \sum_{i=1}^{|S|} C_{S_i} + w_T D_T$$

where:
D = the digest:
$w_L$ = weight value assigned to the number of digest components used to compose D;
$D_L$ = length of D;
$S_L$ = length of each digest component;
$w_k$ = weight value assigned to the number of URIs that reference digests H, where D is a component of H;
$D_k$ = the number of URIs that reference digests H, where D is a component of H;
$w_s$ = weight value assigned to the cumulative credibility score of the information stores with a reference to digest D;
S = set of information stores with a reference to the digest D;
|S| = cardinality of S;
$C_{S_i}$ = credibility score of the data source $S_i$
$w_T$ = weight value assigned to the total number of records T in the digest store that contain the digest D as a component of their digest; and
$D_T$ = total number of records T in the digest store that contain the digest D as a component of their digest.

1301: WriteInfoStore(c, r, d, id)   ( c, r, d are sets of digests, id is unique id
                                      for an information store raw extract record)
1302:     if c is the null set, go to 1309
1303:     if all components of set c are not in set d, return
1304:     read v from digest store using value composite form of c
1305:     add composite form of c to set S
1306:     add id to the reference id array of v
1307:     write v back to digest store
1308:     for all x in r do
1309:         append x to c to create m
1310:         if composite form of m is not labeled as written
1311:             remove x from r to create n
1312:             recursively call WriteInfoStore(m, n, d, id)
1313:     if c is the null set, write id and set S to information store reference
1314: return

FIG. 14

Input 1401

Hashes from information store record:
c3d24dae34dc01c8baa600dd8d9810148b3741eef00f959e3a7186492b8fba72
a6c2221569febb76282953aabf85f648511cbe327a8b20580e6029998184cdeb
0fbc26485e232f572b1a21f1c9e05f832c54fbba1ef95a67cbbb0102d1774cbe Hashes from digest store:
c3d24dae34dc01c8baa600dd8d9810148b3741eef00f959e3a7186492b8fba72
a6c2221569febb76282953aabf85f648511cbe327a8b20580e6029998184cdeb
49dca65f362fee401492ed7ada96f96295eab1e589c52e4e66bf4aedda715fdd Data Identifier:
3024323232

Output 1402

Digest record:
Key:
a6c2221569febb76282953aabf85f648511cbe327a8b20580e6029998184cdeb
c3d24dae34dc01c8baa600dd8d9810148b3741eef00f959e3a7186492b8fba72
InputIds: 3024323232
URIs: "http://github.com/johnlewis", "http://tumblr.com/sarawilson"
CommonDigests:
49dca65f362fee401492ed7ada96f96295eab1e589c52e4e66bf4aedda715fdd Information store reference:
InputId: 3024323232
InformationStoreDigests:
c3d24dae34dc01c8baa600dd8d9810148b3741eef00f959e3a7186492b8fba72
,
a6c2221569febb76282953aabf85f648511cbe327a8b20580e6029998184cdeb
,
a6c2221569febb76282953aabf85f648511cbe327a8b20580e6029998184cdeb
c3d24dae34dc01c8baa600dd8d9810148b3741eef00f959e3a7186492b8fba72
,
0fbc26485e232f572b1a21f1c9e05f832c54fbba1ef95a67cbbb0102d1774cbe

1501: Update(d, id)   ( d is set of digests, id is unique id for an
                       information store raw extract record)
1502:      read all digests for id from digest store into S
1503:      read IRI digests for id from digest store into U
1504:      for each digest x in set S, execute steps 1504 - 1509
1505:           if all component digests of x are not in set d:
1506:                remove x from S
1507:                read x from digest store into v
1508:                remove id from InputIds array of v
1509:                write v back to digest store
1510:      for each digest y in set d, execute steps 1512 - 1514
1511:           if y is not in set S:
1512:                create set r from d minus y
1513:                call step 1101 from FIG 11: WriteInfoStore(y, r, U, id)
1514:      write S to digest store as the updated cross-reference for the id
1515: return

1600

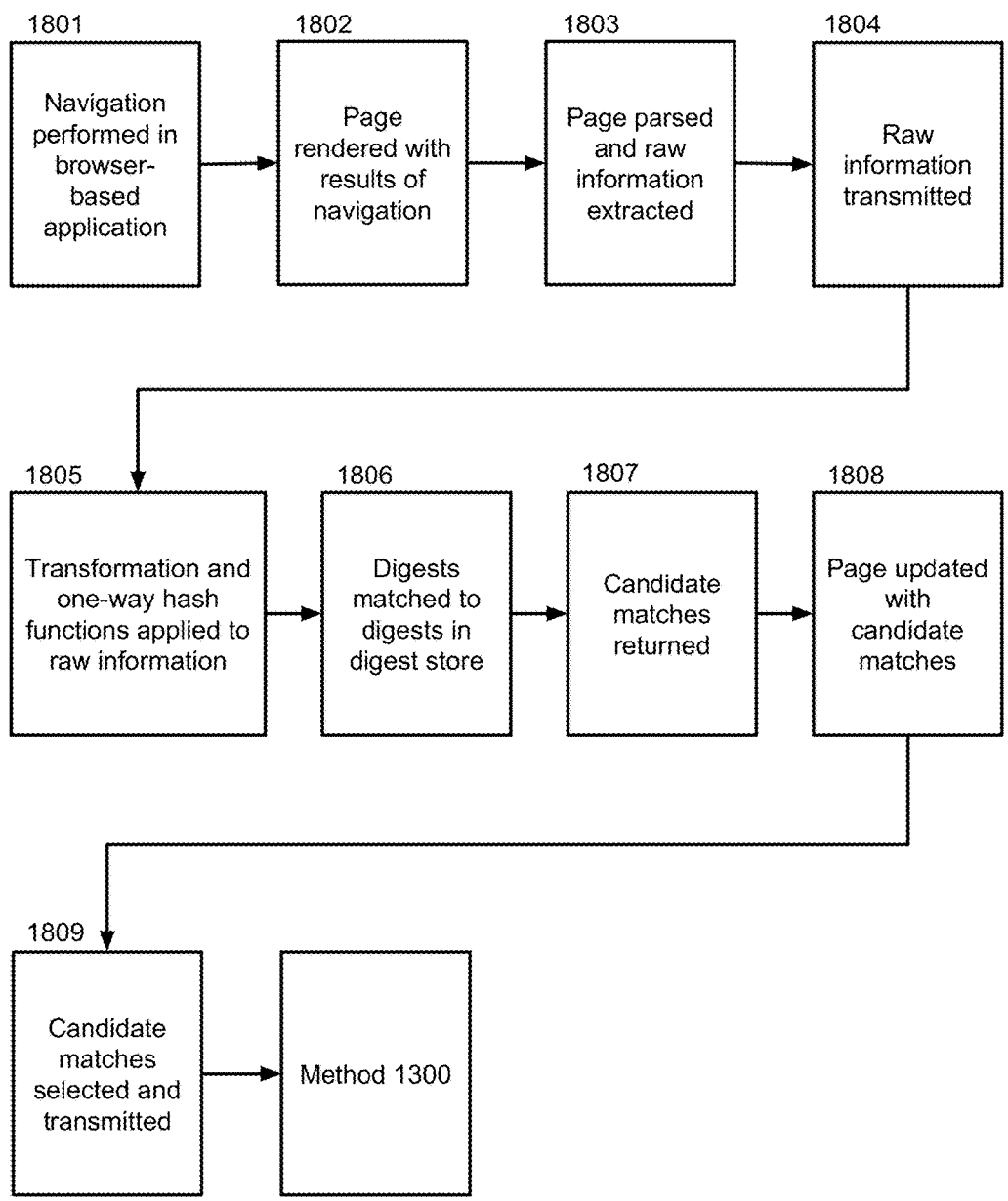

```
                    2010
brad              322f965a2919f46725dece842eb487fc569656d59bf3e1d35cc33cf8a9dcdfec
wilson            919e680ee460849a74a82614de062bfbbac76bc98a2f692952b5fcb6364e598b
san francisco     1a2290470e0aa7549ab1e04b2453274374149ffee517a57715e5206e4142c233
ca                6959097001d10501ac7d54c0bdb8db61420f658f2922cc26e46d536119a31126
united states     981e5b396726008318fcca73b116e69d1680fdbe17a7fb078d10197731f1e700 brad@wilson.com   cc34cdc9abc1813901ff4e35cd4994f2006edaf110c0f87538c5c1f38b1aa1ff
bradwilson.com    d456409281164857bb001eed38f4492a7e58fcd349146fd22dc379c93522e403
                    2020
github.com/
bradwilson        2d8f94cc03bbbdd567aa13d5b9e9945337093ef6f489a64a9e53b486f20592f1
```

SYSTEMS AND METHODS FOR ANALYZING AND STORING NETWORK RELATIONSHIPS

CROSS-REFERENCE TO RELATED APPLICATION(S)

This application claims the benefit of U.S. Provisional Application No. 62/168,122, filed on May 29, 2015, the content of which is hereby incorporated in its entirety.

FIELD OF THE DISCLOSURE

This disclosure relates to methods and systems for analyzing and storing network relationships of information in a digest representation. More specifically, the disclosure relates to analysis of digest representation by augmenting, inferring, extrapolating, deducing, and/or reasoning.

BACKGROUND

The coming of the Information Age has had profound and far-reaching effects on the lives of individuals and in the day-to-day operations of businesses alike. Globally-connected network communication exchanges such as the Internet and the World Wide Web have sparked exponential growth in information availability over even just the past few decades; with no sign of subsiding, the ubiquity of digital information continues to accelerate at an astounding pace. Further, due to the pervasiveness of mobile computing devices in the 21st century, the ability to query for and to retrieve information readily has not only been enabled—it has become an increasingly essential capability.

With exponential growth in the number of Internet-enabled devices that have come online in even just recent years, along with forecasted trends like the Internet of Things (IoT), put lightly, acceleration in the creation of information and its subsequent availability can be palpably anticipated. At the same time, while we've made tremendous strides in the way of assembling, categorizing, and systematically making sense of or reasoning about this information via interconnected graphs of knowledge (e.g. Wikipedia), there exists a vast quantity unable to participate; specifically, information that's purposefully omitted from being shared more readily is often associated with one or more of the following labels: "private", "proprietary", "confidential", "personal", or "secret", just to cite a few. By virtue of the aforementioned obstacle, occurring for both individuals and business entities alike, the flow of information in such cases has become a one-way street: information can come in, but cannot flow out. This creates a conundrum of sorts in that said information can't be readily augmented or supplemented without manual human intervention (e.g. "gatekeepers"). Perhaps stated even more simply: without the ability to communicate the gamut of information one has, it becomes impossible to determine additional value that could be added (e.g. additions, corrections, annotations, etc.).

In the case of an individual, the previous predicament may manifest itself in the form of personal contacts, like a logical address book or rolodex, where it's a common desire to keep said contacts up-to-date. For each contact entry, it's a time-consuming process to go through the exercise of manually changing associated attributes. For instance, a contact entry may have moved geographies as the result of a new job; may have a new profile picture or avatar image; or could have changed job titles, having been promoted. Further, there's valuable information that the contact entry may be missing entirely, which it could potentially be augmented with: an international resource identifier (IRI) at which the contact is represented by an online identity (e.g. a social network), or even something as simple as the contact's age or date of birth.

Unsurprisingly, contact information changes at a quicker pace in the real world than does the respective logical contact entry, especially when the procedure for updating it is in some part manual. While there are certainly methods or systems in existence that attempt to automate this process with little-to-no time investment or level of human intervention required, and despite the inherent value such a service could provide, the owner may not want to use said methods or systems due to a concern for privacy.

Similarly, a business entity may use, for example, customer relationship management (CRM) software to manage interactions with past, current, and/or future customers. These software systems frequently record confidential information that would yield potentially detrimental results if revealed. Accordingly, companies may be reluctant to integrate with external systems in order to augment or complement their internal customer information because of data sensitivity. Instead, businesses may resort to any number of alternative tactics to circumvent the latter.

For example, a company might purchase lists of individuals' information from data brokers and subsequently go through the arduous process of cleansing, de-duping, and integrating it into their existing system(s) (often collectively referred to as an ETL process). In this scenario, notice that the flow of data is unidirectional: it can come in, but it can never go out. Thus, the business's information sensitivity concern has effectively limited the possibility of data augmentation by external systems in a largely automated fashion. Instead, more often than not, humans end up importing, cleaning, and processing this information, despite the fact that it ends up being far less efficient, more error-prone, more time-consuming, and ultimately much more expensive.

Ideally, these individuals and business entities would instead be able to integrate with external systems and have their internal information augmented, but more importantly, without concern for revealing anything considered potentially sensitive. Although attempts in this regard have been made in various limited forms or fashions, no such combination of methods and systems exist to-date.

Conventional information retrieval systems and associated methods focus on satisfying the requirements of a single business. As a result, these systems are designed to retrieve information that fit into memory on a single or small number of machines using an inverted index. Inverted indices allow direct and rapid access given a search key. In order for such inverted indices to perform at acceptable response times for most businesses, they are loaded into and reside in computer memory from a secondary permanent storage. They are usually organized as B-trees or some B-tree variation.

However, scaling an inverted index to support many businesses simultaneously is impractical. First, for large information stores or information stores with a non-uniform key distribution, inverted indices contain a large number of pointers and span several operating system pages. Inserts and deletes are expensive in these cases. Another issue with inverted indices, and what the inventive techniques described herein address, is the space required by these structures. In naive implementations, the overhead of the inverted index structure may be so large that they are impractical to use. To compensate for these limitations, advocates of inverted indices advise, when it is possible to route the information retrieval requests to specific machines, to shard the data by that routing mechanism. When an information retrieval request fails to satisfy the routing mechanism, the request must be sent to each machine, processed by each machine individually and returned to the routing machine to do further processing on the aggregated results from each machine. A business with 25 machines will, in these scenarios, perform over 25 times the necessary work.

BRIEF DESCRIPTION OF THE DRAWINGS

FIG. 1 is a block diagram of an exemplary environment in which aspects of the illustrative embodiments may be implemented;

FIG. 2 is a flow diagram illustrating selective steps of a method in accordance with embodiments of the disclosure;

FIG. 3 is pseudocode that illustrates a set of instructions in accordance with embodiments of the disclosure;

FIG. 4 is pseudocode that illustrate sets of instructions in accordance with embodiments of the disclosure;

FIG. 6 is a data model diagram illustrating selective storage structures in accordance with embodiments of the disclosure;

FIG. 7 is a flow diagram illustrating selective steps of a method in accordance with embodiments of the disclosure;

FIGS. 7A-7B are illustrative of a user interface in accordance with embodiments of the disclosure;

FIGS. 8A-8B are illustrative of raw exported information in accordance with embodiments of the disclosure;

FIG. 10 is a flow diagram illustrating selective steps of a method in accordance with embodiments of the disclosure;

FIG. 11 is pseudocode that illustrates a set of instructions in accordance with embodiments of the disclosure;

FIG. 11A is a formula used in accordance with embodiments of the disclosure;

FIG. 13 is pseudocode that illustrates a set of instructions in accordance with embodiments of the disclosure;

FIG. 14 is illustrative of input to and output from the digest store in accordance with embodiments of the disclosure;

FIG. 15 is pseudocode that illustrates a set of instructions in accordance with embodiments of the disclosure;

FIG. 18 is a flow diagram illustrating selective steps of a method in accordance with embodiments of the disclosure; and FIGS. 19A-19B are illustrative of a user interface in accordance with embodiments of the disclosure.

DETAILED DESCRIPTION

Overview

Figure 5:
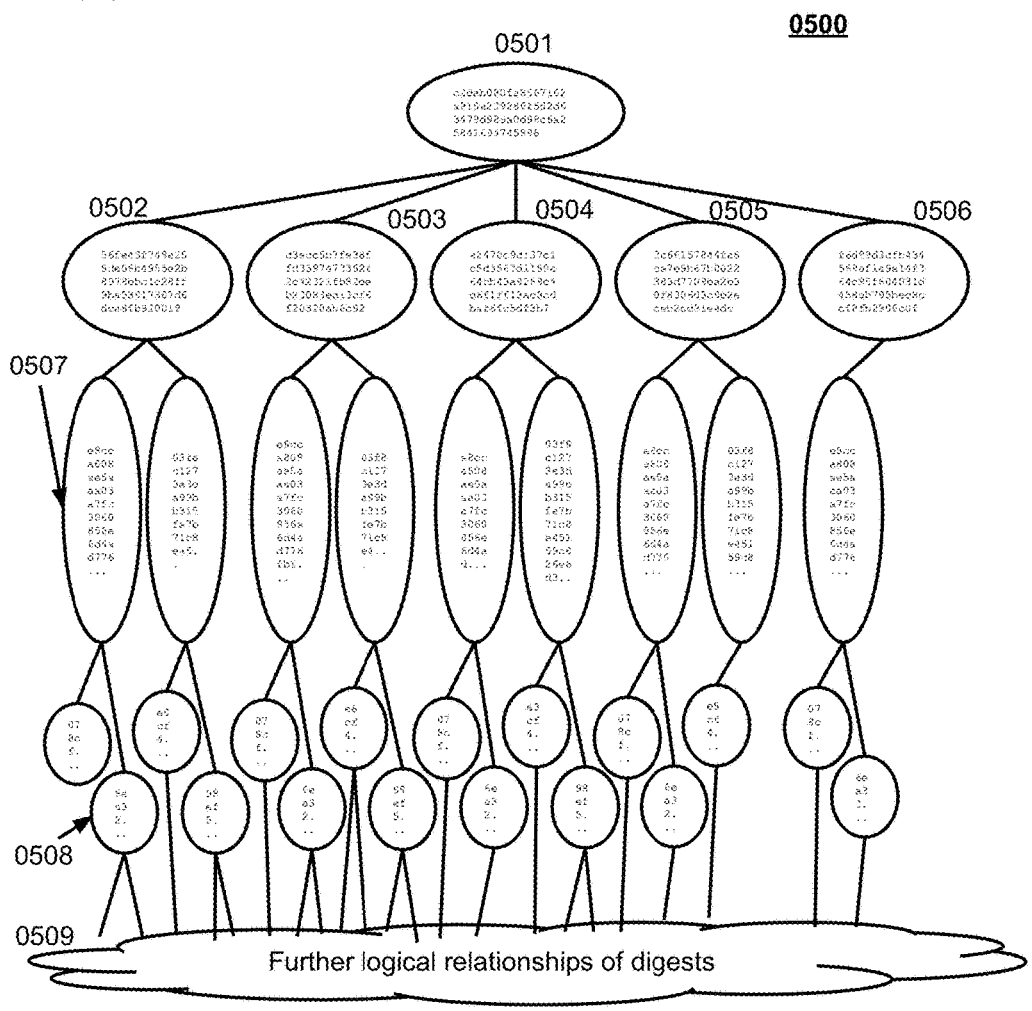
FIG. 5 is a block diagram illustrating an exemplary subset of the digest store in accordance with embodiments of the disclosure.

This document describes methods and systems for augmenting, inferring, extrapolating, deducing, reasoning and storing logical networks of information represented in digest form, thereby enabling the combined inclusion of both sensitive information and non-sensitive information into a compressed, universal, indiscernible format. The inventive techniques disclosed herein allow relationships to be derived or inferred between the aforementioned unintelligible digests of information by, for instance, associating them with a common underlying entity: a person, place, or business, for example. Further, the inventive universal digest format described herein only becomes comprehensible by further utilizing additional a priori or a posteriori knowledge of said information; via this property, recognized digests can be utilized fully, whereas unknown and potentially sensitive digests remain undecipherable.

In the interest of clarity, the inventive techniques described herein build upon conventional digest representation to effectively enable any one such party to provide an arbitrary set of information, with no limitation regarding size or content and possibly including potentially or absolutely sensitive information, and have it be transformed into an unintelligible digest form. The extent to which information is recoverable from the furnished digest(s) is limited to information already known at that instant or information discovered at a future point in time; it follows that, most importantly, no unknown information is ever revealed, thus keeping unknown and potentially sensitive information undecipherable. Conversely, in the event that information is able to be recovered from the unintelligible digest, by very definition, the information was already known or was discovered separately and, consequently, no new information has been revealed.

A digest representation is achieved by making use of one or more one-way functions, whereby a given input is transformed into a deterministic output digest. Notably, for the output digest, the corresponding provided input cannot be recovered (assuming reasonable constraints around time and/or resources). In one embodiment detailed herein, the well-known one-way SHA-256 hash function is utilized.

Building upon this opaque, irreversible representation of underlying information, additional inventive techniques are disclosed herein for: systematically structuring and organizing networks of digests; reasoning about relationships between digests that may have come from a plurality of disparate sources; inferring that individual information records, such as rows in a database, represent the same underlying entity like a person, place, or business; and augmenting stores of information, often external (e.g. a customer's) and/or otherwise considered private, with information obtained from a network International Resource Identifier ("IRI"). The aforementioned inventive techniques may be collectively referred to as "analysis" or "intelligence" in relation to digest representations.

Such an approach may advantageously provide one or more features. For example, in the scenario outlined in the Background section whereby an individual wishes to augment his or her contact information contained in, for instance, a digital address book, he or she may safely utilize an external system that uses the inventive techniques disclosed herein to augment said information without concern, as nothing sensitive has been or will be revealed. Similarly, in the case of the previously mentioned scenario in which a business employing a CRM system wishes to supplement its customer records, it may do so by, for example, engaging peripheral applications or systems that use the inventive techniques disclosed herein, despite the fact that the aforementioned customer records almost certainly contain sensitive information.

In service of providing an additional level of specificity, a concrete scenario follows herein. Consider an individual that has accumulated a large collection of business cards that he or she has collected by attending various events or conferences over the course of many years. If that individual were to transition the set of business cards into an electronic format, whether manually or with software that utilizes optical character recognition (OCR), the end result would be some form of an electronic repository of information representing the underlying originating people. In the interest of alleviating ambiguity, let's say that this information is input into a spreadsheet.

Business cards generally contain a subset of the information associated with a person, such as a name, phone number, email address, company, or job title; however, given that this information represents a specific point in time, the greater the chance it is out-of-date as more time elapses. For instance, attributes associated with a person such as the company they work for and their corresponding job title commonly change. Further, business cards typically omit other pieces of information that the receiver may be interested in knowing, like where that person was employed previously, academic institutions the person attended, or real-world connections the two have in common. It is also plausible that the receiving individual may have captured additional notes about the original conversation that ensued which he or she might want to remain private, such as a detail revealed in confidence.

Given the preceding context of an electronic repository of business cards contained within a spreadsheet, an explanation will now be given as to how the inventive techniques described herein can provide value to the owner. Henceforth, the individual possessing this information, previously referred to as both the "owner" and the "receiver", shall be referred to as the "user".

First, the user may be provided with a user interface with which he or she may input information. In this scenario, the user provides input by furnishing the previously established spreadsheet as a file. In other embodiments, information may be exported from an external system using, for example but without restriction, a programmatic integration over a network. Collectively, all potential sources of information are referred to herein as a plurality of "information stores"; most commonly but without limitation, the plurality of information stores with which the inventive techniques disclosed herein interact may be considered "external", defined as having been provided by a user and/or customer. For the remainder of this example, the originating spreadsheet may be referred to instead as an instance of one such information store (e.g. the information store).

Next, a user interface may give the user the option to both select the information store attributes to export and, of the exported attributes, which should have a one-way function(s) applied to them. In this scenario, the SHA-256 hash function is used as the one-way function of choice. As one of ordinary skill in the art would attest, SHA-256 is a well-known hash function with implementations readily available in most programming languages. Let's suppose that the user chooses to export the following fields: first name, last name, company name, job title, phone number, and email address. Further, let's assume that, wanting to respect the privacy of the individuals represented in the information store, the user has indicated that he or she would like a one-way function(s) applied to every attribute.

Accordingly, a resultant payload would be formulated with the contents of the originating information store, in this case a spreadsheet, in an opaque digest form. Standardization and/or canonicalization functions may be used in conjunction with the inventive techniques disclosed herein to increase textual similarity between other occurrences of the same attribute. For instance, if the company name attribute for an individual appeared as "International Business Machines", even if in digest form, the inventive techniques herein may instead replace it with the digest representation for "ibm". By doing so, the likelihood of matching attributes that have an association with IBM has been increased. In one embodiment, a key-value reference table of common synonyms is maintained to facilitate the respective substitution.

Separately, independent of the user's input, the inventive techniques disclosed herein may obtain information from network IRIs, transform this obtained information into a digest representation, then organize, structure, index, and finally store the digest representation. In the interest of simplicity, this example will consider information located on the professional social networking website LINKEDIN; in practice, information may be indexed in digest form from a plurality of IRI domains without restriction. Continuing, the present embodiment assumes that individual profiles representing each person located in the user-provided information store, where such a profile exists, have already been obtained from their respective IRIs and indexed in digest representation prior to the user's interaction.

Subsequently, the inventive techniques disclosed herein take the digest representation of the user-provided spreadsheet and, although the digests are completely unintelligible, make use of derived and/or inferred intelligence in attempt to find candidate matches pertaining to the same underlying entities within the aforementioned indexed IRI resource information. For instance, suppose one individual record in the user-provided information store, prior to having any transformation functions applied, appears as follows:

{
"first_name": "Steve",
"last_name": "Jobs",
"company": "Apple, Inc.",
"job_title": "Chief Executive Officer",
"phone_number": "123-456-7890",
"email_address": "steve@apple.com"
}

Here, the record is represented using a JavaScript Object Notation for Linked Data (JSON-LD) data-interchange format. As one versed in the art would attest, JSON is commonly used to marshal data in between processes or systems, and JSON-LD is JSON used as a way to represent relationships contained within the JSON. In other embodiments, a plurality of encodings may additionally be utilized. Once transformed into digest representation using the process previously described, the very same record may appear as the following:

{
"first_name": "f148389d080cfe85952998a8a367e2f7eaf35f2d72d2599a-5b0412fe4094d65c",
"last_name": "5d9a17cb70b9733aadc073a44c21889d33325874c51f9c0-c461de3e61a2425eb",
"company": "1804504fae2bb2f3d4551393af4f9fc7a9c229ea7cd17d38-37400c1653634132",
"job_title": "31d123108dba5fd36075ab4f89b130a495b15278b38e8a1-a756bc43926c43e2e", "phone_number":
"c775e7b757ede630cd0aa1113bd102661ab38829ca52a64-
22ab782862f268646",
"email_address":
"10933d29dc2b65cb44d496a4cfce184e82e37f7e6687f61-
beadd3a6b5e8afef6"
}

So that each attribute spans only one line, the font size has been decreased as necessary. In the interest of disambiguation, "steve", "jobs", "apple inc", "ceo", "1234567890", and "steve@apple.com" were used as input values, respectively. Transformation functions in the way of normalization, standardization, and/or canonicalization have been utilized; for instance, attributes have been lower-cased, special characters such as punctuation have been removed, and synonymous diction has been substituted, exemplified by "ceo" having replaced "Chief Executive Officer". Finally, the SHA-256 one-way hash function was applied to the resultant transformed values. Although semantically equivalent language was substituted prior to a one-way function(s) being applied in the present embodiment, it may also occur after a digest representation is obtained for known digests (e.g. first names given by a census).

The inventive techniques disclosed herein would then take the digest representation of the individual record exemplified, along with the digest representations of every other such record, and deduce candidate matches contained within the digest store. Contemplating further the individual record cited above, the inventive techniques would use a logical entity referred to herein as the "digest engine" to look for digest store information with overlapping logical relationships between digests. For instance, one such relationship the digest engine may consider would be all people named "steve" that are associated with "apple inc". It may also solicit people named "steve" that have a job title "ceo". Yet another relationship the digest engine may seek is all people with the last name "jobs", an email address of "steve@apple.com", and a phone number "1234567890". Although each of the preceding examples has been described semantically in plaintext form, the actual comparison would be made using their respective unintelligible digest representations. Moreover, while some attributes included in the present embodiment, such as an email address or a phone number, may be considered "personally identifiable information" in that they uniquely identify an individual, the inventive techniques disclosed herein don't require any such attributes as a prerequisite; specifically, and to reiterate explicitly, had the information store only included attributes of first name, last name, and job title, the inventive techniques herein would still function as described.

While a naive implementation may visit each combination of attributes, having contemplated enough relationships to reach a conclusion, the inventive techniques may return a result set. Regardless, the digest engine may employ, without limitation, probabilistic, statistical, or other alternative methods to determine an ordered result set. In this example and as mentioned heretofore, the present disclosure considers only previously indexed LINKEDIN user profiles within the digest store; for each record contained in the user-provided input, LINKEDIN profile candidate matches would be transmitted back to the user.

In some embodiments, the user then accepts, rejects, or ignores each candidate match returned, as indicated by an input selection or lack thereof. Assuming a candidate match is correct, the user may then augment their representation of the underlying person with information contained in the digest store for the very same person. Additionally, the user may opt to correct or otherwise mutate existing information with a more up-to-date or a more standardized version for example. While the digests remain opaque from a privacy perspective, the inventive techniques disclosed herein may derive intelligence through a plurality of information stores or network IRIs in the way of consensus for a particular attribute. For instance, if a user has an individual record with a job title attribute reading "chief", whereas it has been determined that a plurality of (e.g. 100) information stores have indicated that the underlying entity should instead have job title "chief executive officer", then a suggestion may be presented to the user. For certain well-known attributes, the plaintext version may be offered back to the user as a suggestion; however, by default and by the very nature of a one-way digest representation, the only aspect known is that there has been unanimity around a different value for the same attribute.

In another embodiment, the inventive techniques disclosed herein are combined with other information retrieval techniques in order to balance the tradeoffs between latency and storage and memory requirements. For example, an inverted index may be utilized to store and index the attributes associated with a resource below a certain level in the digest store. Utilizing the inventive techniques of the digest store in combination with an inverted index alleviate some of the constraints associated with deploying a large-scale inverted index while still achieving low latency goals.

Finally, inventive techniques disclosed herein make use of both user selection and non-selection of candidate results to improve future results. As one skilled in the art would attest, ranking functions are commonly employed to determine the relevance of results returned. For instance, the proportion representing the number of times a candidate match is returned versus how often the same match is selected may affect how often it is returned in the future. Similarly, a user indicating that an information store record is related to multiple differing network IRI resources, such as online identities like those found on social networks, may inform future results.

The inventive techniques disclosed herein additionally embody embeddable sets of instructions (e.g. third-party), such as those able to be invoked by a web browser (henceforth referred to as a "browser extension"), for interpreting and subsequently interacting with rendered documents as information stores. As one of ordinary skill in the art would substantiate, third-party sets of invokable instructions are commonly packaged into a format referred to by terminology such as "a plugin" or "an extension". Although the embodiment contemplated is executed within a web browser environment, other embodiments may include a plurality of environments as described heretofore without limitation.

The previously mentioned browser-based example works in a similar fashion to the anterior embodiment, differing only in the way in which the information store is furnished and subsequently provided reciprocal intelligence. Instead of, for instance, providing input by uploading a file or establishing a connection with an external system, the user installs a browser extension and subsequently navigates to a document representing an information store (e.g. a CRM web application or resource on a social network). Although the present embodiment utilizes a set of well-known domains for which the installed browser extension is able to determine how to interpret the document, other embodiments may employ methods such as natural language processing (NLP) to automatically infer the structure and/or meaning of a document. As appreciated by a person of ordinary skill in the art, the present embodiment utilizes a priori knowledge of the well-known domain to parse the document and structure the payload before transmission, thereby substantially reducing the data transmission size and explicitly not collecting sensitive information that may be contained within the HTML. Although the current disclosure does not require type information to accompany each of the attributes (e.g. f148389d080cfe85952998a8a367e2f7eaf35-f2d72d2599a5b0412fe4094d65c is a digest of type "https://schema.org/givenName"), such additional information may accompany the attributes in order to improve the results returned from the digest store.

Once a document representing an information store has been rendered, the installed browser extension interprets the document, extracts pertinent information, and transmits it to the digest engine over the network for further processing. Like the anterior embodiment, the data-interchange format may be, but isn't limited to, JavaScript Object Notation for Linked Data (JSON-LD); the transmitted payload may contain one or more individual records exemplified above as JSON-LD objects. Given the ephemeral nature of rendered documents, ancillary metadata such as an anonymous identifier may be included to uniquely identify respective information stores. Further, any of the previously described transformation functions, including the one-way function(s), may occur in the user's environment ("client-side") prior to being transmitted, or instead after having been received ("server-side") by the systems and devices detailed herein.

After resulting candidate matches are returned to the browser extension over the network by the digest engine, visual elements are injected into the rendered document as to indicate corresponding potential matches to the user. Using these visual elements, the user is provided a mechanism for similarly accepting, rejecting, or otherwise ignoring candidate matches, like the original embodiment. Similarly, the sequence of steps that take place after a user does or opts not to make a selection, disclosed herein for the present inventive techniques, remain the same.

The details of one or more embodiments of the disclosure are set forth in the accompanying drawings and descriptions below. Other features or advantages of the disclosure will be apparent from the description and drawings.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step", "block" and/or "area" may be used herein to denote different elements of methods employed, these terms should not be interpreted as implying any particular order among or between various steps herein disclosed.

A representative environment for implementing example embodiments of the disclosure is first described with respect to FIG. 1. Next, methods of persisting a resource identified by an international resource identifier (IRI) to the digest store in a corresponding digest representation are described. As appreciated by a person of ordinary skill in the art, an IRI is constituted by a string of characters which identify a resource over a network. The terminology "digest" or "digest representation" shall refer to the undecipherable output of a one-way function or a plurality of the outputs of such functions concatenated together. The "digest store" maintains resource information associated with an IRI in digest form, conveniently referred to as a "resource". When it is necessary within the embodiments to distinguish between individual digests output by a one-way function and the sorted concatenation of such outputs, the terminology "component digest" and "composite digest" (a.k.a. "composite form") shall be used, respectively. After describing methods of persisting resource information to the digest store, methods of augmenting external information with information contained within a digest store are presented: the first describes augmenting raw information exported from an information store—like a report, database, or file—with information contained within the digest store; the second contemplates the use of a browser extension in order to augment information presented on certain rendered browser documents.

Example Embodiments

FIG. 1 is a simplified block diagram of a representative environment in which the subject matter described herein may be implemented and comprises an information processing system. The subject matter included in the scope of the present disclosure 0100 is encompassed within dashed lines, including the dashed lines enveloping 0102 and 0117.

It should be understood that this and other arrangements described herein are set forth only as examples. Other arrangements and other components (e.g., machines, interfaces, functions, orders, and groupings of functions, etc.) may be used in addition to or instead of those shown, and some may be omitted altogether. Further, many of the components described herein are functional entities that may be implemented as discrete or distributed components or in conjunction with other components, in any suitable combination and in any suitable location. Various functions described herein as being performed by one or more entities may be carried out by hardware, firmware, and/or software. For instance, various functions may be carried out by a processor executing instructions stored in memory.

Among other components not shown, the system 0100 includes a plurality of user devices (0101 and 0115), a plurality of information storage devices 0103, application programming interface (API) services 0106, a network transport API device 0120, a digest engine device 0108, a caching device 0111, and a digest storage device 0113. The components may communicate with each other via a network 0107.

The components represented in FIG. 1 may be any type of computing device, without limitation; each may comprise a single device or multiple devices cooperating in a distributed environment. For instance, the digest engine device 0108 may be part of a system that comprises multiple devices arranged in a distributed environment that collectively provide the functionality described herein. Network 0107 may include, without limitation, one or more local area networks (LANs) and/or wide area networks (WANs). Such networking environments are commonplace in offices, enterprise computer networks, intranets, and the Internet. Additionally, other components not shown may also be included within the system 0100.

The user 0119, employing a web browser (browser) running on a user device 0101, launches the user interface 0102. In some embodiments, the user device 0101 is a workstation computer with GOOGLE CHROME (CHROME) version 42 installed, a connected keyboard and mouse, 1 GB of memory, a 128 GB disk drive, and connected to a network 0107. The interface 0102 presented on user device 0101 next establishes a connection to the network transport API server (API server) 0109 residing on the network transport API device 0120 by communicating over the network 0107. In some embodiments the API server 0109 is NGINX: version v1.8.0 (commit a3055d1ce9febb3fa0c8d25ba406c7c473efba43) and the network transport API device 0120 is a cluster of GOOGLE COMPUTE ENGINE n1-standard-4 instances, each of which has 4 virtual CPUs and 15 GB of main memory. The network transport API server 0109 returns a response to the interface 0102 running on the user device 0101. As illustrated in further detail in FIG. 7A, the user 0119 imports information in its raw state from a store of information 0104 and selectively chooses individual attributes. After said selections are made, exemplified by FIG. 7B, the user interface 0102 may communicate with API services 0106 over the network 0107 to perform transformation functions on the attributes 0105. A resultant request payload is formulated and subsequently transmitted over the network 0107 to the digest engine 0110 via the API server 0109 for further processing. Upon receipt of the request payload, the digest engine 0110 communicates over the network 0107 with a digest cache 0112, residing on a plurality of caching devices 0111. By way of preference and not limitation, the caching devices 0111 are a cluster of GOOGLE COMPUTE ENGINE n1-highmem-32 instances, each of which has 32 virtual CPUs and 208 GB of memory. Requests from the digest engine are serviced by the cache 0112: if an article being requested is not present in the cache 0112, the caching devices 0111 transparently fill-in the appropriate resource(s) from the digest store 0114, which resides on the digest storage device 0113, by communicating over the network 0107. By way of preference and not limitation, the digest storage device 0113 is GOOGLE CLOUD STORAGE, which provides high availability, robust durability, and near-infinite capacity. Persistence operations initiated by the digest engine 0110 may bypass the cache 0112, making requests to the digest storage device 0113 over the network 0107.

A different user 0118 interacts with a separate user device 0115, possessing similar specifications to the user device 0101 described above. The user 0118 has previously installed a browser extension 0117 from the GOOGLE CHROME Web Store (CHROME Store) into their browser 0116. The CHROME Store provides an online marketplace for the discovery and installation of modules of executable computer code invoked within the CHROME browser; as one skilled in the art would recognize, the installation and subsequent usage of browser extensions from the CHROME Store is common practice. In another embodiment of the present disclosure, the user device 0115 has the FIREFOX browser installed and the browser extension 0117 is installed via the add-ons capability within FIREFOX. In another embodiment of the present disclosure, the user device 0115 has the SAFARI browser installed and the browser extension 0117 is installed via the APPLE SAFARI Extensions website. Additionally, other web browsers not listed that can be extended to invoke custom executable code 0116 may also be included within the system 0100.

Having described a representative environment in FIG. 1, what is presented next in FIGS. 2-6 are methods and associated illustrations of persisting and maintaining resources referenced by an IRI in the digest store in accordance with the inventive techniques disclosed herein.

FIG. 2 is a flow diagram that illustrates a method 0200 for obtaining resource information from an IRI, transforming it into an appropriate format, and persisting it to the digest store in accordance with one embodiment of the present disclosure. As shown at block 0201, the resource referenced by an IRI may be obtained in variety of ways. Although details of obtaining resources from an IRI are beyond the scope of the present disclosure, techniques for obtaining resources from an IRI may include submitting network requests with the appropriate parameters to API servers or web servers.

Having obtained a resource referenced by an IRI at block 0201, named-entities are extracted 0202. As one skilled in the art will recognize, there are standard industry programs used to extract named-entities from text; by way of example only and not limitation, MIT Information Extraction (MITIE) is used herein.

As shown in block 0203, transformation functions are applied to the named-entities extracted by the previous step 0202. As one skilled in the art will recognize, transformation functions may improve the likelihood of matching like information, such as that exported 0105 by an information store 0104 in FIG. 1. Transformation functions may include: conversion to a standard case; the removal of non-alphanumeric characters; translation; the removal of duplicate words; and the standardization of geographies including countries, states, regions, cities, towns, villages, and roads, along with other labels. Other transformation functions are invoked on the textual output in attempt to substitute synonymous, and more importantly canonical, diction prior to creating a digest representation of the information. Examples of diction include but are not limited to: removing accents, lower-casing, tokenizing the words, and textual-differences functions (e.g., Haversine distance, Levenstein distance, NGram distance, and Jaro-Winkler distance). Additionally, other transformation functions may also be included within the system 0200.

The output of applying the aforementioned transformation functions at block 0205 is then used as input to a one-way hash function 0204, the outcome of which is an unintelligible digest representation of the underlying information. As one skilled in the art would understand, with many hashing functions, the slightest variation of input parameters will result in an entirely different digest representation. The actual hash function utilized may be one or more of a plurality of hash functions that one skilled in the art would be familiar with, including but not limited to: BLAKE-256, BLAKE-512, ECOH, FSB, GOST, Grøstl, HAS-160, HAVAL, JH, MD2, MD4, MD5, MD6, RadioGatún, RIPEMD, RIPEMD-128, RIPEMD-160, RIPEMD-320, SHA-0, SHA-1, SHA-2, SHA-3, SHA-224, SHA-256, SHA-384, SHA-512, Skein, SipHash, Snefru, Spectral Hash, SWIFFT, Tiger, or Whirlpool. In other embodiments of the present disclosure, alternative one-way functions may be used.

The resultant digest representation produced at block 0204 is subsequently requested from the digest store 0205; if such a record exists, the associated entry is updated 0206. The process of updating the digest store with an existing digest representation is provided in FIG. 4 as one embodiment of 0206. If however the digest from 0205 does not have a corresponding entry in the digest store, one is created 0207. The procedure for inserting a new digest representation into the digest store is provided by FIG. 3 as one embodiment of 0207. In either of the two previously described scenarios (0206, 0207), the IRI at which the information was obtained and/or additional metadata may be incorporated.

Method 0200 handles both inserts of new records and updates of existing records. New record insertion will be described in connection with FIG. 3, then updates will be described in connection with FIG. 4.

FIG. 3 describes a method 0300 in pseudocode form of how one embodiment of the present disclosure inserts both digest representations and associated logical relationships between said digests into the digest store, as defined by FIG. 2 0207. This method uses a helper function WriteDigest.

At Step 0301, WriteDigest is invoked with three parameters: the current set of component digests to be persisted in their composite form; the set of component digests remaining, comprised of all component digests for the given IRI minus the component digests of the current digest; and the IRI. In step 0302, the composite form of digest d is labelled appropriately as to avoid duplicate operations for the same digest. In step 0303, the composite form of digest d's auxiliary information is retrieved from the digest store and assigned to v. In one embodiment of the present disclosure, the previous auxiliary information is detailed by FIG. 6. The IRI is then appended to the set of referenced IRIs contained in v and persisted back to the digest store in step 0304. Steps 0305-0309 execute a series of instructions in a loop for each x of the remaining component digests r provided as input. A new digest set is created by appending x to d to arrive at d' 0306, while a new remaining digest set r' is created by removing x from the set r 0307. Step 0308 checks the composite form of d' to see if it has been labeled by step 0302; if not, step 0309 recursively invokes WriteDigest with parameters d', r' and uri.

In the embodiment as described by method 0300, a recursive technique for using WriteDigest is employed. However, as one skilled in the art will understand, method 0300 may alternatively be implemented using an iterative sequence of instructions. Method 0300 as described above is synchronous to the caller. In another embodiment of the present disclosure, step 0309 is performed asynchronously. In addition, method 0300 may be further optimized due to, for instance, constraints or service level requirements. Further, digests in common between IRIs for a given digest d may instead be stored with auxiliary information in the digest store in lieu of the loop represented by 0305-0309.

As mentioned above, method 0200 handles both inserts of new records and updates of existing records. Having discussed insertions in connection with FIG. 3, FIG. 4 provides pseudocode for method 0400 of the present disclosure which updates digests previously persisted to the digest store representing a resource obtained via an IRI. This method 0400 corresponds to FIG. 2 block 0206.

In step 0401, two parameters are provided as input: a set of digests d from the hashing output of FIG. 2 0204, and the IRI uri. In step 0402, all the digests that currently relate to uri in the digest store are read into a set S. Digests in S that are not in d are then assigned to D in step 0403; conversely, digests in d that are not in S are assigned to A in step 0404. For each of the digests in D, steps 0405-0409 remove associated references to the digest store. Steps 0405-0407 identify digests in S that are also in D. For each of the digests y that satisfy such criteria, references to uri are removed in step 0408 by: first retrieving auxiliary information for y, then removing uri from the array of referenced IRIs, and finally by persisting the updated auxiliary information back to the digest store. If no further IRIs are referenced by y in the digest store, it is removed from the digest store altogether in step 0409. Steps 0410-0412 add to the digest store for each digest z in set A. Step 0411 creates a set r from d with z removed. Then step 0412 calls method 0300 from FIG. 3 by calling WriteDigest(z, r, uri). After all outstanding mutations to the digest store have been performed, the method terminates.

FIG. 5 is a block diagram 0500 that exemplifies a subset of the digest store. It should be noted that, for the sake of illustration, diagram 0500 and the corresponding network of logical relationships between digests have been visually depicted herein as a graph data structure, and more specifically, a subset of graph data structures called a polytree, as one skilled in the art would attest. However, another embodiment may utilize a different data structure or plurality of data structures without limitation to achieve the desired outcome.

In this embodiment of the present disclosure, digest representations have been created by applying the SHA-256 hashing function to the underlying associated information. For example, block 0501 was computed by applying the SHA-256 hash function to the text "georgia institute of technology", resulting in digest c2dab080fa8567162a918a-229286f5d2d63479d989a0d98c6a25841694745898.

Blocks 0502, 0503, 0504, 0505 and 0506 illustrate logical relationships between the digest for "georgia institute of technology" 0501 and digests for "houston", "atlanta", "chicago", "boston", and "richmond", respectively. All resources referenced by an IRI that contain the attributes "georgia institute of technology" and "houston", for example, will have the digest at block 0502 in common. Block 0507 illustrates a logical relationship additionally with the attribute "female"; therefore, all resources referenced by an IRI that contain the attributes "georgia institute of technology", "houston" and "female", for example, will have block 0507 in common. Similarly, block 0508 illustrates an additional logical relationship between the combination of "georgia institute of technology", "houston", "female" and a new attribute. In the interest of brevity, further logical relationships of digests may continue 0509 without limitation within the digest store 0500.

In one embodiment of the present disclosure, auxiliary information associated with a particular digest is combined into a file, named in accordance with the very same digest, and persisted to the digest store. For instance, the file pertaining to block 0504 would be named "a2470c9d137c1c5d3567d1180a64cb43a9269c4d6f1ff13 ac8cdbaf6fc5df3b7c2dab080fa8 567162a918a229286f5-d2d63479d989a0d98c6a25841694745898", and its auxiliary information is further described in FIG. 6. In another embodiment, the auxiliary information is stored in a database. Other representations of the digests may be used in addition to or instead of those shown. In one embodiment of the present disclosure the digest representations are persisted in an encoded form; by way of example and not limitation, the technique(s) employed may include the well-known DEFLATE data-compression algorithm, an encoding scheme such as Base64, or a checksum function.

FIG. 6 describes an individual record of the digest store in one embodiment of the present disclosure. Area 0601 represents the structure of auxiliary information associated with a digest. InputIds encompasses all information store records that reference the given digest, while IRIs is composed of all the IRIs that reference the very same digest. CommonDigests represents digests shared between two or more IRIs, as defined by an intersection of component digest sets with Key. IRIsBelow represents a set of IRIs, in digest representation, that contain a reference to the current digest. In one embodiment of the present disclosure, IRIsBelow is discarded upon reaching a certain threshold in terms of the length of its contents. Metadata is comprised of a set of key-value pairs that store ancillary information about the digest. By way of example and not limitation, metadata may contain: the number of fills that reference the digest; the number of InputIds with references to the digest; the number of occurrences in which the digest was not selected, as described in FIG. 12; and the output of a vector auto regression model on user selections (or lack thereof) as described in FIG. 12.

Area 0602 of FIG. 6 represents a data structure which provides a reference from the unique identifier of an information store record to the one or more digests it references.

Area 0603 of FIG. 6 represents a data structure which provides a reference from a IRI to each of the component digests contained within the resource located at it.

Having described methods of persisting resources obtained from an IRI to the digest store in digest representation, what is presented next in FIGS. 7-17 are methods of exporting information from an external source (information store) and augmenting it with information from the digest store, in accordance with the present disclosure.

Flow diagram FIG. 7 depicts a data processing pipeline in accordance with one embodiment of the present disclosure. In it, information exported from an information store may be obtained in a plurality of ways, including: executing queries against the information store; using a product in conjunction with the information store; reading log files or database transaction log files associated with the information store; calling application programming interfaces that read from the information store; or in response to collected events occurring within the information store. An information store may be, but is not limited to, one or more of the following: a database, spreadsheet, file, customer relationship management (CRM) system, contact list, or any other format containing information with logical relationships between its component attributes. As one skilled in the art will recognize, an information store may be physically located within the premises of the owner or in a different location altogether, in which case it may be accessed over a network such as the Internet.

As shown at block 0701, input containing logical relationships between component attributes is imported into the user interface corresponding to FIG. 1 block 0102. The individual attributes to be hashed are chosen by the user in 0702, as further illustrated in FIG. 7B. As shown in 0703, transformation functions are called via API services using the raw exported attributes as input. With the result of 0703, a one-way hash function is applied to the attributes specified in 0702. A request payload is formulated 0705 using the digests, the excluded attributes (those the user opted not to have the hash function applied to), and the logical relationships, which is then subsequently transmitted 0706 to the network transport API device FIG. 1 block 0120.

Figure 7B:
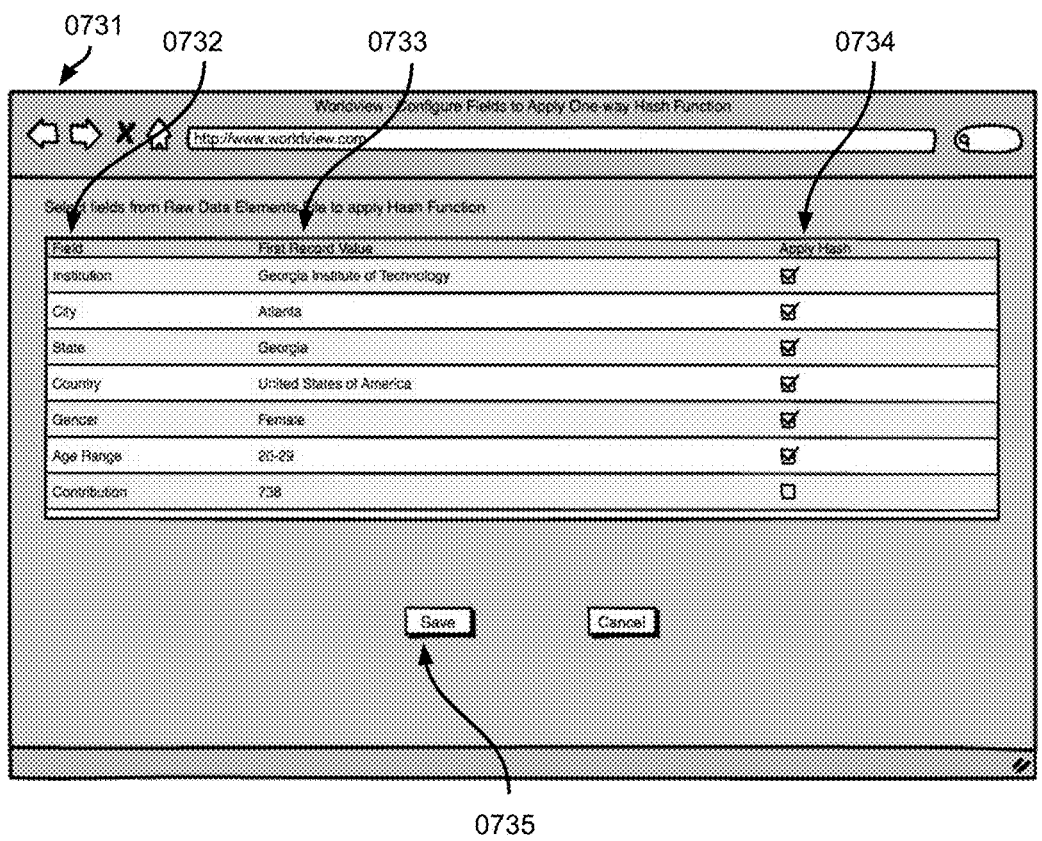

FIGS. 7A-7B provide illustrations, in one embodiment of the present disclosure, of how a user imports information and specifically selects which attributes should have a one-way function applied to them. FIG. 7A and FIG. 7B correspond to FIG. 7 blocks 0701 and 0702, respectively. While a user interface is presented as having been rendered in a web browser, in other embodiments of the present disclosure, additional interfaces may include mobile applications, sensor display screens, desktop applications, kiosks and touch displays. A user interface may also be implemented as a browser extension, capable of being invoked in any environment or on any device in which the corresponding web browser operates. After document 0721 is rendered, input may be chosen by clicking 'Choose File' 0722. A prompt is then opened 0723 to select one or more files. As one skilled in the art will recognize, prompts for importing files from a file system are common in the industry. The name(s) of the file(s) selected is reflected on the rendered document 0724; after optionally configuring corresponding settings, the 'Import' button 0725 becomes available to be pressed by the user to proceed the next state, shown in FIG. 7B.

Moving on now to FIG. 7B, document 0731 is rendered after the 'Import' button 0725 is pressed. Here, each of the attributes able to be exported are listed 0732 in preview form along with their attribute name, the value 0733 of the first occurrence, and a checkbox allowing the user to select which to apply a one-way function to 0734. In this illustration, the user has chosen to apply the function to the institution, city, state, country, gender and age range attributes, while he or she has opted not to apply the function to the contribution attribute and thus excluded this attribute. After selections have been made, the 'Save' button 0735 may be pressed to initiate the next steps in accordance with the embodiments of the present disclosure.

Figure 8B:
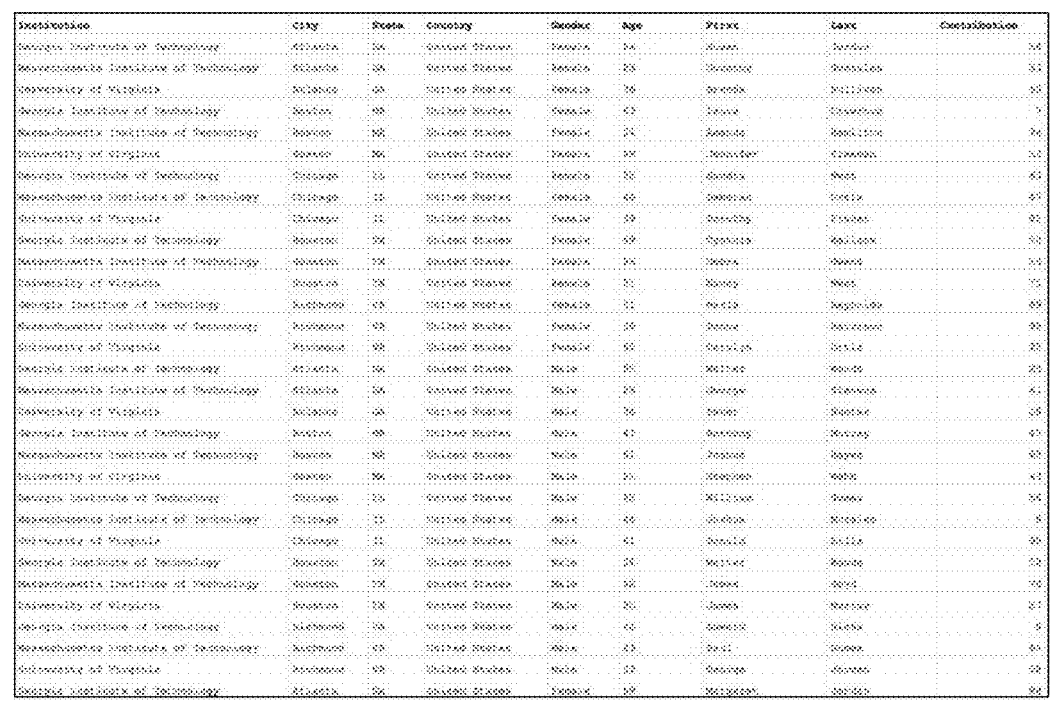

By way of illustration only and without limitation, FIG. 8A exemplifies a sample payload of raw information having been exported from a respective store: contribution amount by institution, city, state, country, gender and age range. FIG. 8B demonstrates yet another payload, resulting from a database query, as an embodiment of the present disclosure.

Figure 9A:
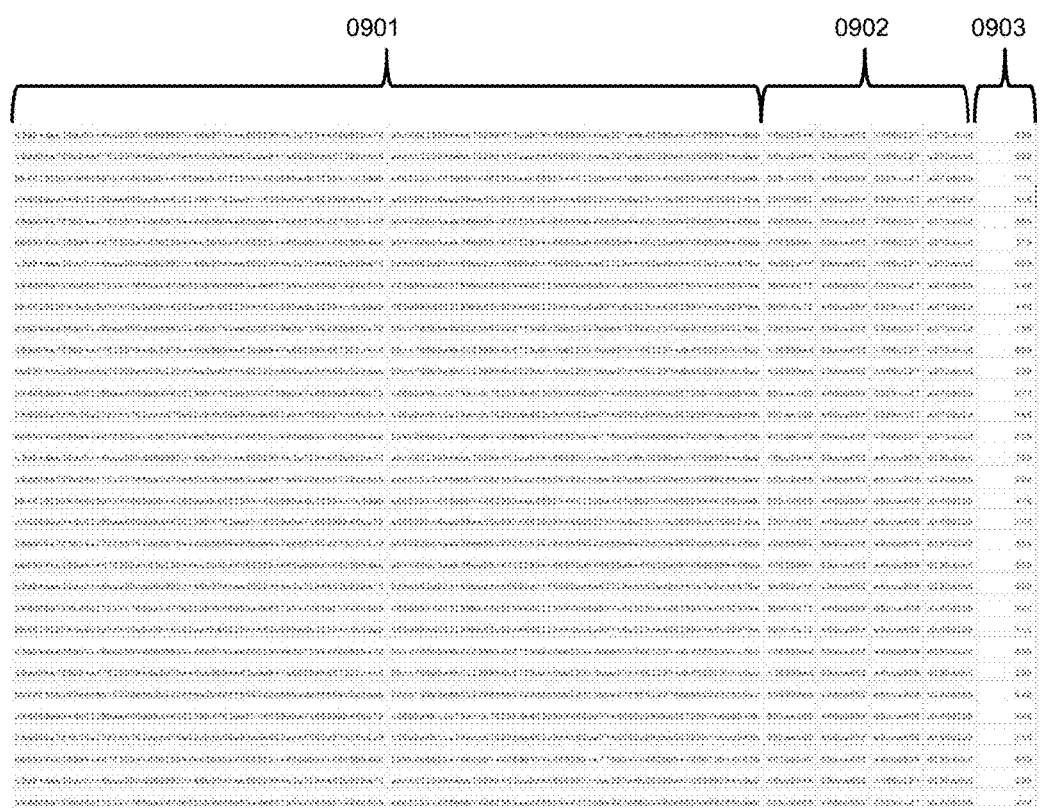
FIGS. 9A-9B are illustrative of the payload transmitted to the digest engine device in accordance with embodiments of the disclosure.
Figure 9B:
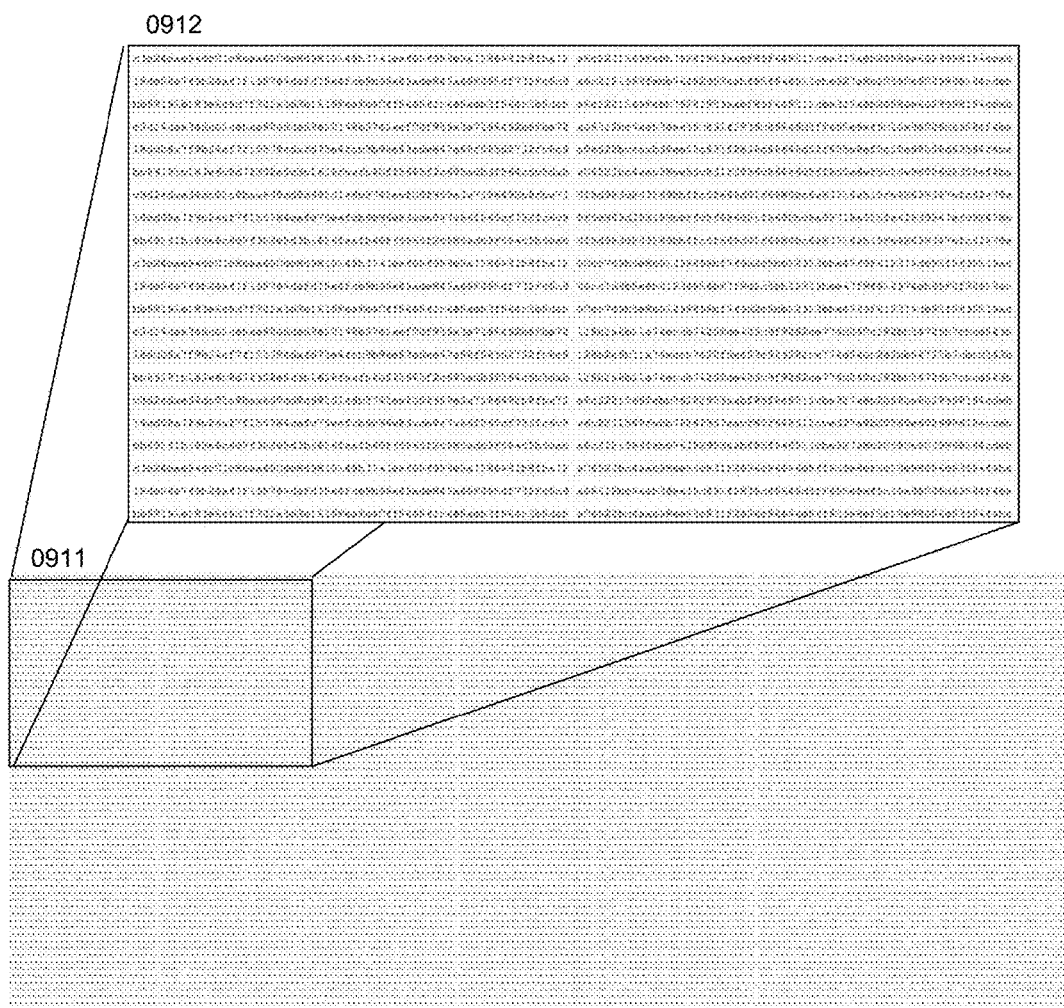

FIG. 9A illustrates the payload transmitted, as defined by FIG. 7 block 0706 in one embodiment of the present disclosure and additionally corresponding to the raw exported information shown in FIG. 8A. In the interest of readability, digests in this figure have been abbreviated. Attributes of institution and city are demonstrated by section 0901 in digest representation; as one skilled in the art will recognize, given finite resources and reasonably constrained by time, the computational complexity associated with reversing any one of these digests renders it impossible for all intents and purposes in the case of most modern hashing functions. Area 0902 corresponds to the state, country, gender, and age range fields from FIG. 8A. Area 0903 demonstrates that, for one or more individual attributes, and in this case the "contribution" attribute, a user of the user interface may opt-out of having a one-way function applied. In this embodiment of the present disclosure, the contribution attribute would be transmitted in plaintext. Similarly, FIG. 9B embodies another transmission payload corresponding to information exported from an information store in FIG. 8B. Area 0911 represents digests corresponding to: institution, city, state, country, gender, age, first name, and last name. Area 0912 magnifies area 0911.

In FIG. 10, the payload sent by FIG. 7 block 0706 is received by the digest engine device 1001 from the user device 0101 via the network transport API device 0120. Each record of the transmission is then processed 1002: if found 1003 and additionally if in plaintext form, API services may be notified to request transformation functions be applied prior to creating a digest representation of the information 1004. The digest store is checked to determine if the record has previously been linked to entries in the digest store 1005, in accordance with embodiments of the present disclosure. If so 1006, the digest store is checked for changes 1007 and appropriate mutations are made; if instead no such record exists, a no-op occurs. After either of the preceding take place, the record is matched to a digest in the digest store 1008; FIG. 11 describes this method in more detail. Steps 1002-1008 are repeated until no further input records remain. At this point, candidate matches are returned to the user interface 1009.

FIG. 11 outlines pseudocode for the matching process of the digest engine that corresponds to FIG. 10 1008.

Method 1100 receives as input 1101 the output of FIG. 10 block 1004 in one embodiment of the present disclosure, which may include the set of digests that comprise the attributes of a record.

For any individual attribute contained within the input payload that exists in raw plaintext form, steps 1102-1103 may apply a prerequisite set of tasks before continuing. In step 1102, transformations are applied to the input and named-entities are extracted. In 1103, a one-way function is applied to the output of 1102 to create a digest representation. Moving on to step 1104, in one embodiment of the present disclosure, a request is formulated using the set of digests d from 1101 in order to locate related digests within a similarity-based reference table consisting of a source digest, canonical digest, and similarity score.

In step 1105, the output of 1103 and 1104 are unioned to create a set of digests d'. Step 1106 creates two sets: a set of digests S that have been visited and sorted based on their match score, and a result set T. Step 1107 invokes method 1121 with parameters of null and d' respectively; upon completion, the result set T is returned to the caller.

Step 1122 determines if, during the recursive invocation of 1121 from step 1136, a threshold on the number of results in set T has been reached in order to ensure sufficient match results are returned. In one embodiment of the present disclosure, this threshold is established based on the cardinality of T. In another embodiment, the threshold is determined by the number of entries in T with a match score above a certain value. Other embodiments may apply statistical formulas across a subset of T's elements to govern whether or not a threshold has been reached. In any situation, once a threshold has been reached, method 1120 returns.

When method 1121 is initially invoked (by 1107), parameter c is the null set and parameter r contains the digests unioned in step 1105. Step 1123 determines if method 1121 was invoked by 1107 or recursively by 1136; if c is the null set, method 1121 has been invoked by 1107 and steps 1124-1131 should be skipped after r' is overwritten by f r. If, however, c is not the null set, method 1121 has been invoked by step 1136 recursively and steps 1124-1131 should be executed. After the composite digest form of c is marked as visited in step 1124, it is used to query the digest store, the results of which are saved in v. If no records are found, it effectively indicates that there are no IRIs associated with digest c in composite form within the digest store; accordingly, the method returns.

Having populated digest set v, in step 1127, a score is calculated indicating the degree to which there is a match between digests contained within c and v; one embodiment of the formula used to calculate this score is described in FIG. 11A. Additionally, step 1127 allows for a variety of functions to be used to calculate a score; for instance, a user or administrator may specify which of a plurality of scoring functions to use. In another embodiment of the present disclosure, a user may be given the ability to provide an entirely new scoring function. In step 1128, the set of digests in c, the set of digests in r and the score are assigned to S. Then in step 1129, the unique ids referenced by composite form of digest c, the digest set c and the match score are written to set T.

Step 1130 determines if a threshold has been reached; if so, it returns. If not, the next instruction 1131 retrieves the highest score from S and assigns digests c and r from S to c' and r', respectively.

Steps 1132-1136 loop over each x of the digests in set r', assigning new values of m and n in each iteration. Step 1133 appends x to the completed set c' to create set m. Then step 1134 removes digest x from r' to create n. If m has not yet been visited 1135, then step 1136 recursively invokes 1121 with m and n. Upon completion, the method returns.

Method 1100, as embodied, employs a recursive technique. As one skilled in the art would understand, it may alternatively be implemented using an iterative sequence of instructions. In another embodiment of the present disclosure, step 1136 is performed asynchronously. In addition, method 1100 may be optimized based on, for instance, constraints or particular requirements; by way of example and without limitation, multiple invocations of method 1120 may be executed concurrently.

FIG. 11A shows the scoring formula used in FIG. 11 step 1127 in one embodiment of the present disclosure. The resultant score is influenced by a number of factors, including but not limited to: the total number of individual digests concatenated together; the number of relationships at or below a given digest; the combined credibility score of input sources; the number of input sources that agree on a relationship; the frequency and credibility of rejected relationships; and the total number of matches found.

Figure 12:
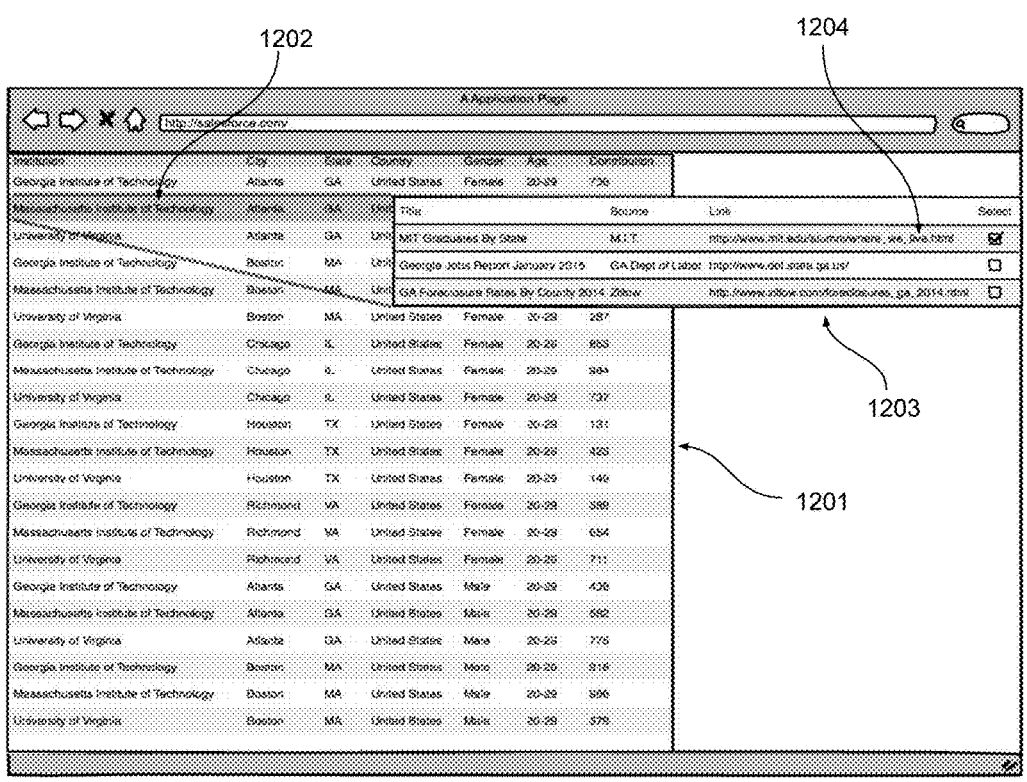
FIG. 12 is illustrative of a user interface in accordance with embodiments of the disclosure.

FIG. 12 provides an illustration in one embodiment of the present disclosure of how a user may approve candidate matches returned from the digest engine as described in FIG. 10 block 1009. In this illustration, a user interface is presented as having been rendered within a web browser. However, in other embodiments of the present disclosure, additional interfaces may include mobile applications, sensor display screens, desktop applications, kiosks, or touch displays. The interface may also be implemented as a browser extension or in other forms of embedded environments in which custom behavior has the ability to be invoked.

Area 1201 corresponds to information exported from a store like that of FIG. 7. block 0701; it may include the original information in its entirety or a subset of said information. The user may select any of the records from area 1201. In this illustration, the user has selected record 1202. Upon submission of one or more selections, candidate matches are presented to the user in a form similar to area 1203. In this example, the results returned include the title, source, and link. In other embodiments of the present disclosure, additional information presented to the user to assist with the selection process may include but is not limited to: a confidence score, metadata or other ancillary data, photos, a geographic location, or an associated timestamp such as the point in time at which the result was last modified.

In this illustration, the user may select zero or more of the results returned in area 1203, thus designating candidate matches as recognized matches. In one embodiment of the present disclosure, as selections occur, the corresponding records in area 1202 are highlighted. Here, the user has selected returned result 1204, as denoted by the checkbox; accordingly, the user has effectively indicated that result 1204 is in fact related to information store record 1202, confirming the suspected reference between and subsequent choice of the proposed candidate match. This reference is in turn transmitted to the digest engine device, via the network transport API server, to be written to the digest store as shown in FIG. 13.

In another embodiment, the user does not make any selections. The duration of time spent on each record of area 1201, along with the set of candidate matches, both selected and not selected, is relayed back to the digest engine device to improve future match recommendations.

In yet another embodiment of the present disclosure, the user may be presented with an option to explicitly reject a candidate match presented in area 1203 as an indication of an incorrect result. This information is transmitted to the digest engine device to be written to the digest store, to improve future match recommendations.

FIG. 13 provides pseudocode substantiating one embodiment of the present disclosure which creates a reference between the export of an information store and information contained within the digest store.

Line 1301, the declaration of WriteInfoStore, receives input resulting from a user making zero or more selections as described in FIG. 12. Parameters include: a set c of digests; a set r of digests that are associated with the selected IRI, but excluded from c; a set of digests d exported from an information store; and a unique identifier id pertaining to an individual record exported from an information store.

Step 1302 checks the value of c, as the initial invocation of WriteInfoStore is made with c equal to the null set and r containing every digest associated with a given IRI. Subsequent invocations of WriteInfoStore are performed recursively beginning with step 1312, described further below. If it is affirmed that c is in fact the null set, then the procedure skips to step 1308; if not, the next step executed is 1304, which loops through each element of c and checks if it is contained in d. If not, it is not possible to create a reference between the exported information store record and information located in the digest store for digest c, so the function terminates. The function may return a value indicating the reason for termination.

Step 1304 retrieves auxiliary information from the digest store using the composite form of c. Step 1305 adds this composite digest to set S, which maintains all references between an id and its composite digest entries in the digest store. Step 1306 appends id to the set of identifiers associated with v and re-persists it to the digest store in step 1307.

Steps 1308-1312 loop through each element x of set r. In step 1309, x is appended to c and then stored in m. Step 1310 checks if the composite form of m is labeled complete and, if not, executes steps 1311 and 1312. Step 1311 removes x from set r to create set n. Then, step 1312 recursively invokes step 1301 (WriteInfoStore) with parameters of m, n, d and id. Step 1313 checks if c is the null set, indicating the initial invocation of 1301; if so, id and set S are persisted to an information store reference structure, as described in FIG. 6 area 0602. Finally, in step 1314, the procedure returns.

In the embodiment described by method 1300, a recursive technique is employed. As one skilled in the art would understand, this method may alternatively be implemented using an iterative sequence of instructions. In another embodiment of the present disclosure, the step 1312 is performed asynchronously.

FIG. 14 is an exemplary illustration of references written to the digest store by methods 1300 in one embodiment of the present disclosure.

Area 1401 is representative of the input to process 1300 in one embodiment of the present disclosure. Area 1402 illustrates the output in another embodiment of the present disclosure. It should be noted that, in the interest of clarity, irrelevant or unnecessary information for the sake of demonstration has been explicitly omitted. As one can clearly see, two digests overlap between the user-selected records from the information store and digests contained by the digest store: "c3d24dae34dc01c8baa600dd8d9810148b37-41eef00f959e3a7186492b8fba72" and "a6c2221569feb-b76282953aabf85f648511cbe327a8b20580e6029998184c-deb". As a result, in addition to other mutations that may be made to the digest store, the identifier "3024323232" will be appended to the array of InputIds for the digest store entry with the key "a6c2221569febb76282953aabf85f648-511cbe327a8b20580e6029998184cdebc3d24dae3 4dc01c8-baa600dd8d9810148b3741eef00f959e3a7186492b8fba72", as previously outlined in FIG. 6 area 0601. Additionally, in one embodiment of the present disclosure, the InformationStoreDigests entry in the information store record, as described in FIG. 6 area 0602, contains the array: [c3d24dae34dc01c8baa600dd8d9810148b3741eef00f959-e3a7186492b8fba72, a6c2221569febb76282953aabf85f6-48511cbe327a8b20580e6029998184cdeb, a6c2221569-febb76282953aabf85f648511cbe327a8b20580e60299981-84cdebc3d24dae34 dc01c8baa600dd8d9810148b3741eef-001959e3a7186492b8fba72, 0fbc26485e232f572b1-a21f1c9e05332c54fbba1ef95a67cbbb0102d1774cbe] This represents each of the component digests for the information store record along with the composite digest.

FIG. 15 illustrates pseudocode to update the digest store with previously-inserted records from an information store. Method 1500 accepts two parameters: a set of digests d representing attributes exported from an information store, and a unique identifier associated with the corresponding information store record. In step 1502, information associated with the provided identifier is retrieved from the digest store and stored in set S. Additionally, digests associated with IRIs that have been referenced are stored in set U. Steps 1504-1509 loop through each element x of set S, determine if their reference should be removed 1505, and subsequently do so wherever appropriate in steps 1506-1509. For step 1505, each of the component digests x of S is checked against set d; for any component digests not present in d, steps 1506-1509 are executed to remove corresponding references in the digest store. In step 1506, component digest x is removed from S. Next, in step 1507, x is used to read auxiliary information from the digest store into v, followed by id being removed in step 1508. Updated auxiliary information is written back to the digest store in step 1509.

Step 1510 loops through each digest y in set d, checking to see if it exists in S in step 1511; for each digest that is new, steps 1512 and 1513 are executed. Step 1512 creates r from the set d with y removed. Step 1513 invokes method 1301 from FIG. 13 to create new references to the identifier for the new digests. Method 1301 additionally appends newly-added digest references to set S. In step 1514, S is persisted back to the digest store with any relevant mutations.

Figure 16:
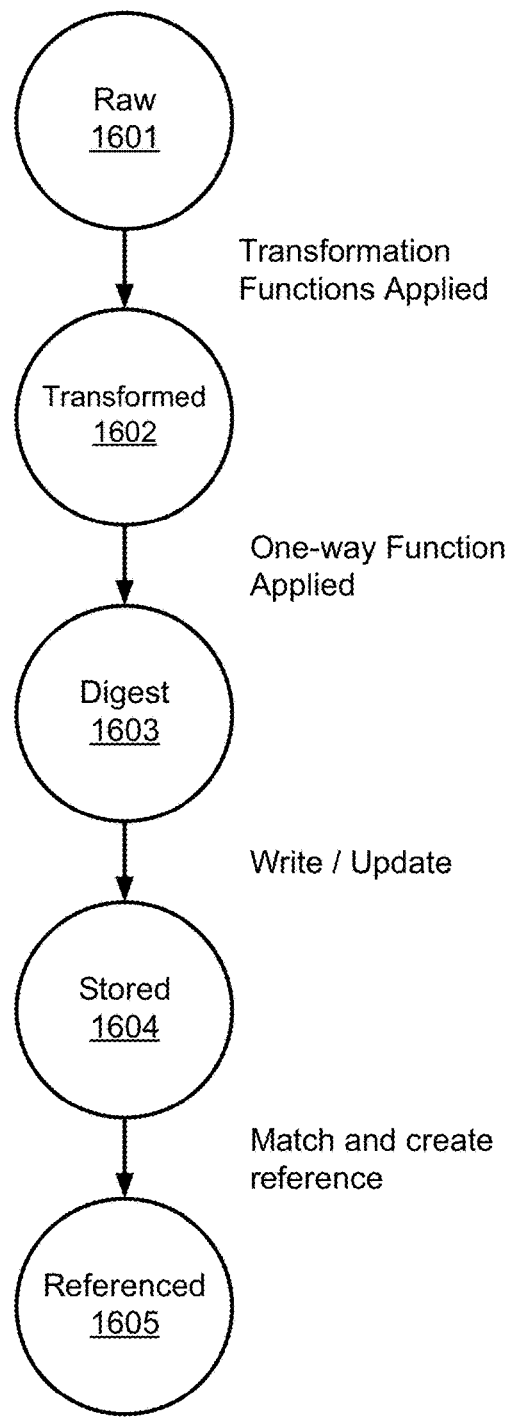
FIG. 16 is a state machine diagram that illustrates changes in information state in accordance with embodiments of the disclosure.

FIG. 16 shows a state machine diagram in accordance with the embodiments of the present disclosure. Block 1601 is the raw state of information retrieved from a IRI as described in FIG. 2 block 0201. After transformation functions have been applied as described in FIG. 2 block 0203, the corresponding state is represented by 1602. State 1603 is transitioned to by applying one or more one-way functions as previously cited in FIG. 2 block 0205. After mutations comprised by FIG. 2 blocks 0206 and 0207 occur, the system progresses to state 1604. Continuing, once one of potentially many references between information exported by an information store and related information in the digest store is formulated, in accordance with the embodiments of the present disclosure, the state transitions to 1605.

Figure 17:
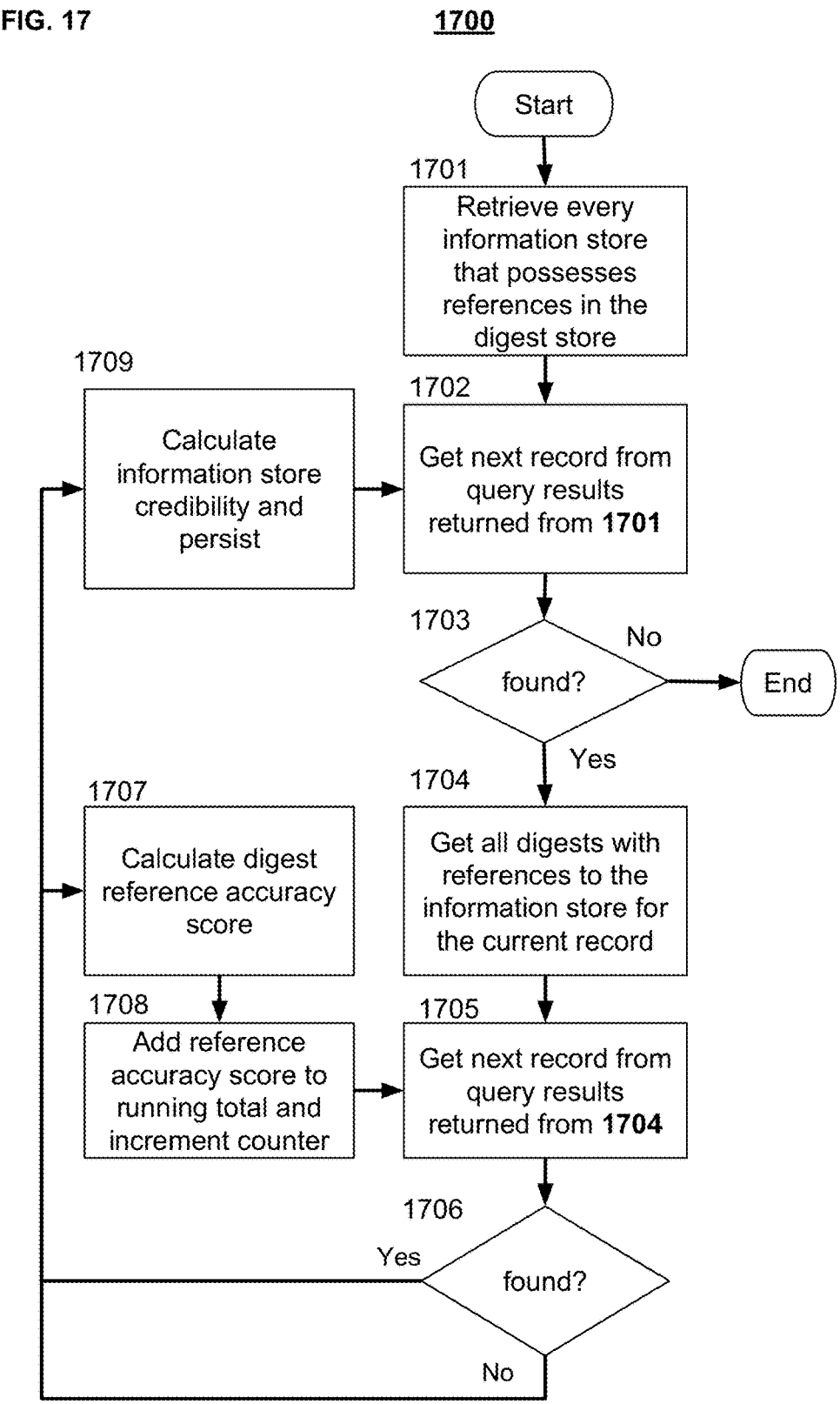
FIG. 17 is a flow diagram illustrating selective steps of a method in accordance with embodiments of the disclosure.

Flow diagram FIG. 17 describes a method 1700 of calculating and assigning an information store credibility score in one embodiment of the present disclosure.

In block 1701, every information store that possesses references to the digest store is retrieved; these are created and persisted as described in FIG. 13 1308. Blocks 1702-

1709 are executed in a loop until block 1703 determines that no further records remain to be processed, at which point the method terminates.

The next step retrieves all digests associated with the information store record 1704. The aforementioned digests are iterated through in blocks 1705-1708. If the return value of block 1706 is negative, block 1709 is executed. In one embodiment of the present disclosure, the credibility calculation is performed by averaging the values from block 1707. In a second embodiment of the present disclosure, the median value is used instead. In yet another embodiment, the values from block 1707 are binned, weights are placed on each bin, and a weighted average is computed based on the number of records in and the weights placed on each bin.

If block 1706 returns a positive assertion, indicating that there are more records to be processed, blocks 1707 and 1708 are invoked in respective order.

For block 1707, a score is computed based on the reference between an information store and information contained within the digest store for a given individual record. The derivation of said score in one embodiment of the present disclosure is as follows:

Let X be defined as a set of digests exported from an information store.
Let Y be defined as a set of digests created from information obtained from a IRI and residing in the digest store.
Let Z be defined as the set resulting from the logical union of X and Y.

$$X = X \cup Y$$

For members of set Z, we perform the following calculation:

$$\sum_{i=1}^{|Z|} \frac{(U_t w_{Z_i} t_{Z_i})}{(U_t w_{Z_i} t_{Z_i}) + (U_m w_{Z_i} m_{Z_i}) + (U_e w_{Z_i} e_{Z_i})}$$

where $|Z|$=cardinality of Z
and $U_t$=system-wide number when $Z_i \in |X|$ and $Z_i \in |Y|$
and $U_m$=system-wide number when $Z_i \in |X|$ and $Z_i \notin |Y|$
and $U_e$=system-wide number when $Z_i \notin |X|$ and $Z_i \in |Y|$
and $t_{Zi}$=count of component digests c in $Z_i$ where $c \in |X|$ and $c \in |Y|$
and $m_{Zi}$=count of component digests c in $Z_i$ where $c \in |X|$ and $c \notin |Y|$
and $e_{Zi}$=count of component digests c in $Z_i$ where $c \notin |X|$ and $c \in |Y|$
and $w_{Zi}$=digest weight from digest store for $Z_i$.

In one embodiment of the present disclosure, the digest weight $W_{Zi}$ is calculated as follows:

$$w_Z = \sum_{i=1}^{|s|} (w_e + c_{S_i} w_f)$$

where s=set of information stores that have references to digest Z
and $|s|$=cardinality of set s
and $w_e$=system-wide number assigned when an information store has a reference to a digest; this number is independent of the credibility of the information store
and $w_f$=system-wide number applied to each $c_{si}$ when an information store has reference to a digest; this number is dependent on the credibility of the information store
and $c_{si}$=credibility of an information store s, In one embodiment of the present disclosure, the sequence of steps outlined above are executed. In another embodiment of the present disclosure, matrices are instead used to perform the calculations.

Block 1708 both: takes the result of block 1707 and adds it to a running total, and increments a count of the total number of records processed, each for the present information store. These values are used in block 1709.

Figure 19A:
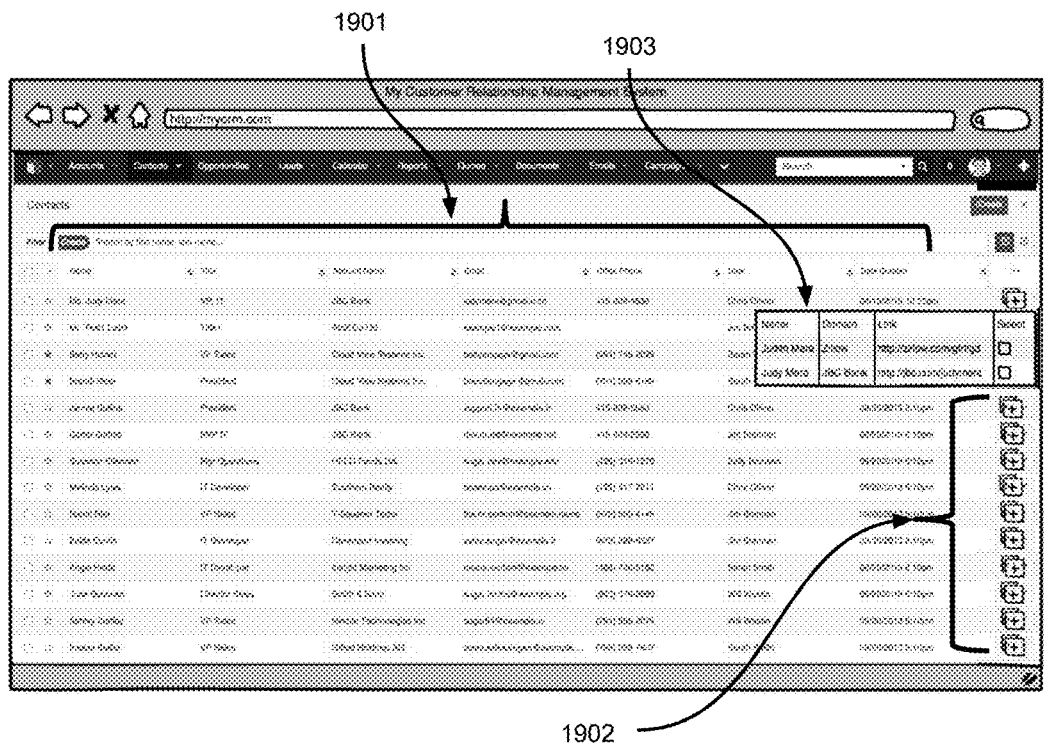
Figure 19B:
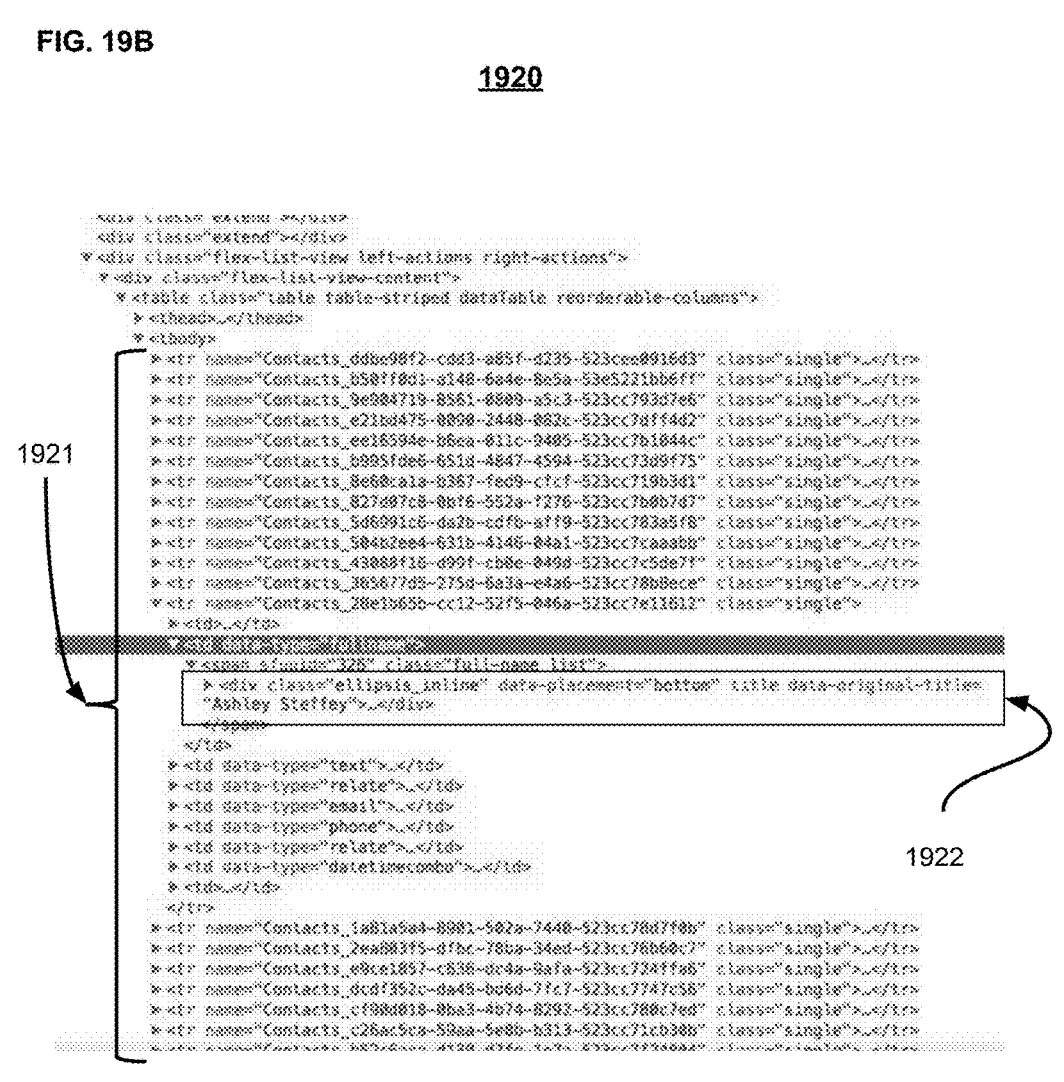
Figure 20:
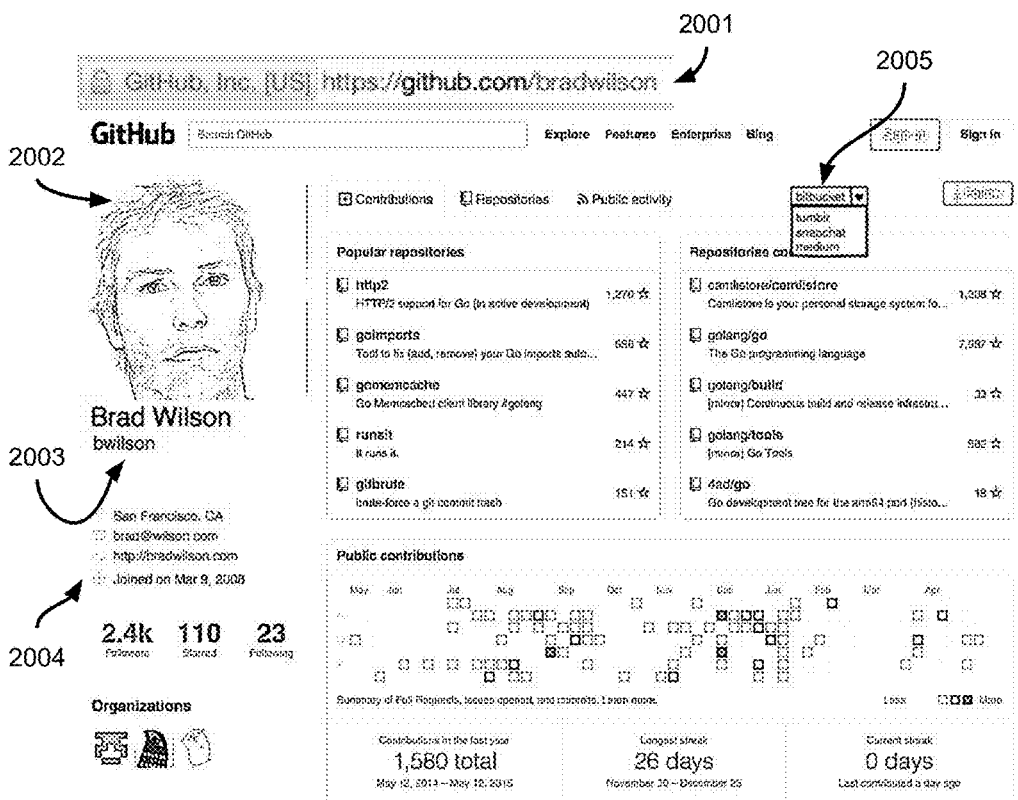
FIG. 20 is illustrative of a user interface in accordance with embodiments of the disclosure.

Having described methods of exporting and augmenting information from an external information store with related information from the digest store, what follows in the way of FIGS. 18-20 are embodiments pertaining to the augmentation of rendered browser documents with information from the digest store, in accordance with the present disclosure. This allows a user to visually inspect candidate matches and, in the interest of augmenting or otherwise mutating existing information, make respective selections.

Flow diagram FIG. 18 illustrates a method 1800 by which a user may execute queries against and have results returned from the digest store via a browser extension. The user device herein may be conceptualized as FIG. 1 block 0115. By way of example and not limitation, the illustration herein is of a search being performed after having navigated to an external website or web application.

For block 1801, a document is navigated to by a user 0118 from FIG. 1; by way of example and not limitation, in one embodiment of the present disclosure, 1801 is a customer relationship management system. Other popular destinations may include: marketing automation systems, list management applications, social networks and search applications.

After the browser renders 1802 in response to step 1801, the resulting document is parsed by a browser extension 1803; subsequently, raw information is extracted and transmitted to the digest engine device 1804.

Transformation and one-way functions are applied to the information extracted from the document 1805 to create corresponding digest representations, described in further detail in FIG. 10 block 1004. The resultant digests are then matched against digests contained within the digest store 1806, as described in further detail in FIG. 10 block 1008. Candidate matches are then transmitted from the digest engine device to the user device 1807.

In block 1808, the browser extension takes the resulting payload transmitted in block 1807 and visually injects it into the previously rendered document. The user can then interact with a plurality of said visual elements injected into the document; pertinent input, such as user selections, may be captured by the browser extension and later transmitted to the digest engine device 1809 in order to inform future intelligence and/or decisions.

In one embodiment of the present disclosure, method 1300 is invoked with the transmission from 1809.

An illustration of FIG. 18 block 1802 is shown in FIG. 19A area 1901. Here, area 1902 demonstrates visual elements having been injected into a rendered document as described by FIG. 18 block 1808 in one embodiment of the present disclosure. Area 1903 illustrates how candidate matches may appear in response to the user having selected an injected visual element, as described in FIG. 18 block 1809.

FIG. 19B is representative of a document rendered by a browser; one skilled in the art will recognize this as hypertext markup language (HTML) loaded into the browser's Document Object Model (DOM). Area 1921 illustrates portions of the DOM that contain information able to be extracted by the browser extension; area 1922 highlights one such individual DOM node. In one embodiment of the present disclosure, the browser extension infers the method used to extract information from a document by inspecting the document's location.

In another embodiment of the browser extension, FIG. 20 illustrates an HTML document 2000. Information may be extracted from the document, and related information may be injected into the document from the digest engine. The IRI for the document is shown in area 2001 and, after applying transformation functions, is represented by "github.com/bradwilson"; area 2020 shows its digest representation. By way of illustration and without limitation, attributes extracted from this document include: a digital representation of image 2002, the person's name and public profile identifier 2003, and other metadata about the person like location, email address or personal website 2004. After applying transformation functions and one-way functions, the information as it appears in area 2010 is transmitted to the digest engine in accordance with the embodiments of the present disclosure. By way of illustration and not limitation, information pertaining to the same underlying entity (e.g. a person) is transmitted back to the browser extension from the digest engine. The extension then injects this information into the document in the form of one or more visual elements as illustrated in 2005.

As can be understood, embodiments of the present disclosure identify methods and systems for analyzing and storing logical networks of information in a digest representation by augmenting, inferring, extrapolating, deducing, and/or reasoning. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it can be seen that this disclosure is one well adapted to attain various ends and objects set forth above, together with other advantages, as a person of ordinary skill in the art would appreciate. It should be understood that certain features and sub-combinations are of utility and may be employed without reference to other features and sub-combinations.

The invention claimed is:

1. A computer-implemented method, the method comprising:

receiving, by a computing device comprising at least one processor, a resource retrieval request from a requesting device, wherein the resource retrieval request is associated with a plurality of attributes of content;

identifying, by the at least one processor, a plurality of attribute digests that is obtained by applying a one-way function to each of the plurality of attributes, each attribute digest of the plurality of attribute digests corresponding to a respective attribute of the plurality of attributes, the plurality of attribute digests forming a composite digest;

matching, by the at least one processor, the plurality of attribute digests with a respective set of attribute digests associated with each of a plurality of network resources stored on storage accessible by the computing device, computing, by the at least one processor, a respective ranking score for each of the plurality of network resources, wherein computing the respective ranking score for a particular network resource comprises:

determining a total number of individual digests concatenated together in the composite digest;

determining a number of individual matching digests between the composite digest and a particular respective set of attribute digests associated with the particular network resource; and computing the respective ranking score for the particular network resource based at least in part on the total number of individual digests in the composite digest and the number of individual matching digests;

ordering, by the at least one processor, the plurality of network resources based at least in part on the respective ranking score for each network resource; and returning, by the computing device to the requesting device, a respective identifier enabling access to each of the plurality of network resources and the ordering of the plurality of network resources in response to receiving the resource retrieval request.

2. The computer-implemented method of claim 1, wherein a user device applies the one-way function to each of the plurality of attributes to obtain the plurality of attribute digests and transmits the plurality of attribute digests to the computing device via one or more networks.

3. The computer-implemented method of claim 1, further comprising:

applying, by the at least one processor, the one-way function to each of the plurality of attributes to obtain the plurality of attribute digests.

4. The computer-implemented method of claim 1, wherein each attribute digest comprises a respective type based at least in part on which the respective ranking score is calculated.

5. The computer-implemented method of claim 1, wherein the respective ranking score for the particular network resource is further computed based at least in part on one or more factors comprising at least one of: a number of contributors of the respective set of attribute digests associated with the particular network resource, a credibility factor associated with the contributors, a number of data sources contributing to the respective set of attribute digests, a credibility factor associated with the data sources, a number of attribute digests not in common between the resource retrieval request and the particular network resource, and a frequency of occurrence of each attribute digest in common between the resource retrieval request and the particular network resource.

6. The computer-implemented method of claim 5, wherein the resource retrieval request comprises a unique identifier of a user associated with the resource retrieval request, the method further comprising storing, by the at least one processor, the unique identifier in association with the plurality of attribute digests.

7. The computer-implemented method of claim 1, further comprising storing, by the at least one processor, the plurality of attribute digests in association with the resource retrieval resource request.

* * * * *